(12) United States Patent
Carnevali

(10) Patent No.: US 7,850,133 B2
(45) Date of Patent: Dec. 14, 2010

(54) SUCTION CUP HAVING COMPACT AXIAL INSTALLATION AND RELEASE MECHANISM

(76) Inventor: Jeffrey D. Carnevali, 5957 Beach Dr. SW., Seattle, WA (US) 98136

( * ) Notice: Subject to any disclaimer, the term of this patent is extended or adjusted under 35 U.S.C. 154(b) by 576 days.

(21) Appl. No.: 11/895,003

(22) Filed: Aug. 22, 2007

(65) Prior Publication Data
US 2009/0050758 A1 Feb. 26, 2009

(51) Int. Cl.
*A45D 42/14* (2006.01)
*F16B 47/00* (2006.01)
(52) U.S. Cl. .............. 248/205.5; 248/683; 248/205.7; 248/205.8; 248/206.2; 248/362; 248/363
(58) Field of Classification Search ............... 248/683, 248/205.5, 205.7, 205.8, 206.2, 362, 363
See application file for complete search history.

(56) References Cited

U.S. PATENT DOCUMENTS

| | | | |
|---|---|---|---|
| 1,871,113 A | 8/1932 | Compter et al. | |
| 2,089,714 A | 8/1937 | Schuler | |
| 2,542,101 A | 2/1951 | Suben | |
| 2,940,713 A | 6/1960 | Van Dusen | |
| 3,765,638 A | 10/1973 | Harrison | |
| 4,093,165 A | 6/1978 | Sussman | |
| 4,934,641 A | 6/1990 | McElhaney | |
| 5,029,786 A | 7/1991 | Wu | |
| 5,065,973 A | 11/1991 | Wang | |
| 5,087,005 A | 2/1992 | Holoff et al. | |
| 5,104,077 A * | 4/1992 | Liu | 248/205.8 |
| 5,381,990 A | 1/1995 | Belokin et al. | |
| 5,992,806 A | 11/1999 | Adams | |
| 6,045,111 A | 4/2000 | Hsieh | |
| 6,193,197 B1 | 2/2001 | Lian | |
| 6,478,271 B1 | 11/2002 | Mulholland | |
| 6,502,794 B1 * | 1/2003 | Ting | 248/206.2 |
| 6,666,420 B1 | 12/2003 | Carnevali | |
| 6,932,306 B2 * | 8/2005 | Zou et al. | 248/205.5 |
| 6,966,530 B2 * | 11/2005 | Hsu | 248/206.2 |
| 7,226,026 B2 * | 6/2007 | Lin | 248/205.5 |
| 7,431,250 B2 * | 10/2008 | Chen | 248/205.5 |
| 7,455,269 B1 * | 11/2008 | Chien et al. | 248/205.8 |

(Continued)

FOREIGN PATENT DOCUMENTS

AU 0 159 046 4/1953

(Continued)

*Primary Examiner*—Terrell Mckinnon
*Assistant Examiner*—Michael McDuffie
(74) *Attorney, Agent, or Firm*—Charles J. Rupnick

(57) ABSTRACT

A novel suction cup mounting apparatus having a novel compact axial suction cup installation and release mechanism and method for assembling such a suction cup apparatus. The suction cup device includes a suction cup portion of a plunger assembly fit within a concave drive base and coupled thereto by a rigid drive pin. An optional rotational drive member or "handle" structured to operate on an external surface of the drive base may be provided for manipulating the drive pin relative to the suction cup and drive base. The suction cup device is intended to secure some device—a "utilization device"—to a surface. Therefore, according to another aspect of the suction cup device, a utilization mounting surface is projected above the drive base.

32 Claims, 10 Drawing Sheets

U.S. PATENT DOCUMENTS 7,607,622 B2 * 10/2009 Carnevali .................. 248/205.8
7,635,111 B2 * 12/2009 Hara et al. ................ 248/205.8

FOREIGN PATENT DOCUMENTS

| | | |
|---|---|---|
| FR | 2 347 563 | 11/1977 |
| GB | 0 813 265 | 5/1959 |
| GB | 0 906 624 | 9/1962 |
| GB | 0 975 271 | 11/1964 |
| GB | 1 193 899 | 6/1970 |
| JP | 4 05 220042 | 8/1993 |

* cited by examiner

SUCTION CUP HAVING COMPACT AXIAL INSTALLATION AND RELEASE MECHANISM

FIELD OF THE INVENTION

The present invention relates to the field of suction cups, and in particular to axial suction cup installation and release devices and methods.

BACKGROUND OF THE INVENTION

Suction cups are generally well-known and commonly used to mount and secure objects to smooth surfaces such as the surfaces of glass, plastic, Formica, glazed tile, metal, and other smooth surfaces. A typical suction cup includes a cup body and a stem. The cup body is generally arcuate or circular and defines a concavity. Typically, the stem is integrally formed on the body and used as the place of attachment for the object to be supported by the suction cup. At least the body of the suction cup is made of rubber, plastic or other material having sufficiently elastically resilient properties such that, when the body is pressed against a smooth surface, the volume of concavity is reduced, thereby forcing air to be expelled so that the body forms an air-tight seal against the smooth surface. Atmospheric pressure outside the body retains the suction cup body against the surface. When the air-tight seal is broken, air rushes into the concavity, releasing the vacuum and the suction attachment to the surface. Whereupon the elastically resilient material of the suction cup body returns to its relaxed condition. The resilient suction cup can be repeatedly reused.

Suction cups are difficult to properly position. Once a suction cup is attached to a surface, the suction forces (atmospheric and friction) resist repositioning of the cup. Attachment of the suction cup to an object can also be a problem. Preferably, the attachment should be releasable.

Furthermore, the vacuum within the suction cup resists the resilient force of the body so that the force of suction balances the resilient force of the body of the suction cup. The result is a limit on the degree of vacuum which can be achieved.

One way this limitation on the vacuum can be at least partially overcome is by "pulling" the center of the suction cup body away from the surface, thereby at least partially overcoming the restraining effect of the vacuum and generating an even greater vacuum. The periphery of the suction cup forms an air-tight seal with the surface. When the center of the suction cup body is pulled resiliently away from the surface, a partial vacuum is formed between the body and the surface so that the suction cup body "sticks" to the surface. The greater the vacuum the better the cup sticks to the surface.

Several devices have been proposed to "pull" the center of the suction cup away from the surface in order to increase the suction. The most common arrangement, often found for example on the bases of pencil sharpeners and many kitchen appliances, involves a rod or crankshaft which extends mainly parallel to the surface to which the suction cup is to adhere. The center of the suction cup is attached to an eccentric section of the rod or crankshaft, and when a lever arm is turned, the center of the suction cup is pulled outward. U.S. Pat. No. 2,089,714, HOLDING DEVICE, issued Aug. 10, 1937, to Schuler; U.S. Pat. No. 3,765,638, SUCTION MOUNT, issued Oct. 16, 1973, to Harrison; and U.S. Pat. No. 4,934,641, CURVED SURFACE SUCTION MOUNTING APPARATUS, issued Jun. 19, 1990, to McElhaney, all of which are incorporated herein by reference, all describe such shaft-based arrangements.

One problem with arrangements using crankshafts and eccentric rods is the lever arms which extend out from whatever device they are mounted in. The lever arms is all too easy to hit or snagged, and the suction is thereby accidentally released. Another drawback of lever arms is that the support and bearing structure for them is difficult to integrate into the structure of the device which is utilizing the suction cups. This complication increases costs and the likelihood of failure.

A further cause of increased costs associated with such suction cup assemblies according to the prior art is that they usually require suction cups that must be specially designed to accommodate the lever arms, crankshafts, and the like.

More recently, U.S. Pat. No. 5,087,005, TWIST-CAM SUCTION CUP ASSEMBLY, issued Feb. 11, 1992, to Holoff, et al. and U.S. Pat. No. 5,381,990, RELEASABLE SUCTION CUP ASSEMBLY, issued Jan. 17, 1995, to Belokin, et al., both incorporated herein by reference, proposed devices for "pulling" the center of the suction cup axially.

Holoff, et al., for example, discloses a suction cup assembly having a suction cup, a cam member, a cone member and a mating core member secured to the suction cup. The cone member has an outer periphery generally co-extensive with an outer portion of the suction cup, and a generally cylindrical inner opening closely enclosing a cylindrical outer surface of the core member. The cam member has generally cylindrical camming surfaces, and is mounted onto and closely engages either the core member or a camming flange on the cone member, depending on the embodiment. The cam member axially shifts the core member outward relative to the cone member by pulling the center of the suction cup away from a surface to which the suction cup may be adhered.

Belokin, et al. discloses a releasable suction cup formed by a cup body which has a duct passing therethrough and a valve element for opening the duct, whereby the vacuum holding the suction cup can be released for repositioning the suction cup. The valve extends through the duct and is threaded on one end to receive a threaded fastener which is used to move the valve element into a sealing position and to secure the suction cup to an object.

The axial suction cup devices of Holoff, et al. and Belokin, et al. and others however are overly complex to manufacture, assemble and operate, as well as suffering other limitations.

Therefore, the inventor of the present invention invented the apparatus and method for a suction cup device as disclosed herein in FIGS. 1-6, and in U.S. Pat. No. 6,666,420 issued on Dec. 23, 2003, which is incorporated herein by reference, having a compact axial suction cup installation and release mechanism. The suction cup device includes a suction cup within a concave housing, and an axial drive member structured to operate on an external surface of the housing. A drive shaft is coupled to a central portion of the suction cup and extends through an aperture in the housing, projecting above a drive surface axially aligned with the concave surface formed in the housing. The drive shaft extends through a central aperture in the axial drive member and interacts with an inclined drive surface to pull the central portion of the suction cup toward and push it away from the concave surface of the housing when the axial drive member is rotated in first and second opposite directions relative to the housing.

SUMMARY OF THE INVENTION

The present invention is a novel suction cup mounting apparatus having a novel compact axial suction cup installation and release mechanism and method for assembling such a suction cup apparatus. According to one aspect of the present suction cup, the suction cup device includes a suction cup portion of a plunger assembly fit within a concave drive base and coupled thereto by a rigid drive pin. An optional rotational drive member or "handle" structured to operate on an external surface of the drive base may be provided for manipulating the drive pin relative to the suction cup and drive base. The suction cup device is intended to secure some device—a "utilization device"—to a surface. Therefore, according to another aspect of the suction cup device, a utilization mounting surface is projected above the drive base.

The drive base includes a dish-shaped bell housing member formed with a shallow concavity in a first "suction" surface, and a drive stack member formed substantially upright on the bell housing member external of the concavity and substantially axially aligned therewith.

The plunger assembly includes the suction cup coupled to a foot portion of a substantially rigid drive shaft member. In the suction cup device, the drive shaft member extends through a central aperture in the drive base concavity that communicates with a chamber formed in the substantially upright drive stack member, and a deformable portion of the suction cup fits into the shallow concavity in the suction surface. The drive shaft member is slidable relative to the upright drive stack member along an operational drive axis of the device. A guide mechanism maintains relative rotational orientation between the drive shaft and drive stack members. A pair of cooperating installation drive and reaction surfaces and are formed between the drive shaft and the upright drive stack members. The cooperating installation drive and reaction surfaces are mutually inclined relative to the device operational drive axis. Together with the drive pin the cooperating mutually inclined installation drive and reaction surfaces form a spiral suction cup installation drive mechanism between the drive shaft and upright drive stack members. The cooperating installation drive and reaction surfaces are circumferential surfaces formed in respective tubular walls. By example and without limitation, relatively inclined circumferential slots in the respective tubular walls of the drive shaft and drive stack members form the cooperating circumferential installation drive and reaction surfaces. For example, a pair of the installation drive surfaces are formed as a pair of the circumferential slots diametrically opposed in the tubular walls of the upright drive stack and oriented substantially normal to the device operational drive axis. In other words, the circumferential slots are oriented substantially horizontal to the vertical tubular walls of the drive stack member. Alternatively, the pair of diametrically opposed circumferential slots forming the installation drive surfaces in the tubular walls of the drive stack member are optionally inclined relative to the device operational drive axis climbing in a clockwise spiral away from the dish-shaped bell housing member toward the utilization mounting surface projected there above.

A pair of the cooperating installation reaction surfaces are formed by example and without limitation as a pair of the circumferential slots diametrically opposed in the tubular walls of the plunger drive shaft member and angularly oriented relative to the device operational drive axis. In other words, the pair of diametrically opposed circumferential slots formed as spirals in the vertical tubular walls of the drive shaft member with the circumferential slots climbing in a counterclockwise spiral away from the foot portion thereof and a central portion of the suction cup coupled thereto.

Else, when the pair of diametrically opposed circumferential drive slots forming the installation drive surfaces in the tubular walls of the drive stack member are inclined relative to the device operational drive axis for climbing in a clockwise spiral away from the dish-shaped bell housing member toward the utilization mounting surface, the pair of diametrically opposed circumferential slots forming the cooperating installation reaction surfaces are optionally oriented substantially normal to the device operational drive axis. In other words, the circumferential slots are optionally oriented substantially horizontal to the vertical tubular walls of the plunger drive shaft member when the drive slots forming the installation drive surfaces are inclined relative to the operational drive axis, whereby the spiral drive slots and uninclined circumferential reaction slots forming the cooperating installation reaction surfaces are cooperatively mutually inclined relative to one another and the device operational drive axis.

The drive pin interfaces with the cooperating installation drive surfaces and installation reaction surfaces for driving the drive shaft member of the plunger assembly along the operational drive axis inwardly of the chamber within the drive stack member of the drive base. In turn, the foot portion of the drive shaft member draws the central portion of the suction cup into the shallow concavity in the suction surface of the drive base. Meanwhile, a peripheral lip portion of the dish-shaped bell housing member around the mouth of the cavity is structured to cooperate with a thickened inner peripheral annular ring of the suction cup for constraining a larger peripheral lip of the suction cup from being drawn into the concavity. Thus, an integral thin deformably resilient annular portion of the suction cup is stretched between the relatively stiff round center section and the integral peripheral lip portion.

The drive pin and mutually inclined installation drive and reaction surfaces of the spiral suction cup installation drive mechanism thus cooperate to move the drive shaft member of the plunger assembly relative to the drive stack member of the drive base along the operational drive axis. This relative motion of the drive shaft and drive stack members result in moving the central portion of the suction cup into the shallow concavity, while the peripheral lip of the suction cup is constrained to remain substantially stationary relative to the peripheral lip portion around the mouth of the cavity so that the thin deformably resilient annular portion of the suction cup is stretched between the suction cup's center section and its integral peripheral lip portion.

When the cooperating installation drive surfaces and installation reaction surfaces are formed as the cooperating pairs of circumferential drive slots and reaction slots, respectively, a pair of diametrically opposed diamond-shaped keyhole openings results on opposite sides of the device where the pairs of mutually inclined cooperating drive and reaction slots intersect. The diametrically opposed pairs of mutually inclined cooperating drive and reaction slots formed through the opposing tubular drive stack and drive shaft side walls intersect substantially along a common axis of intersection which is oriented substantially normal to the device operational drive axis. The common axis of intersection is shared by the pair of diametrically opposed keyhole openings.

The drive pin is inserted through the diametrically opposed keyhole openings, and thereafter maintains the pair of keyhole openings. The inserted drive pin additionally operates to retain the plunger drive shaft member relative to the drive stack member of the drive base.

Circumferential rotation of the inserted drive pin relative to the drive shaft and drive stack members forces the diametrically opposed keyhole openings to move along the respective pairs of mutually inclined cooperating drive and reaction slots. As discussed herein, the guide mechanism maintains relative rotational orientation between the drive shaft and drive stack members. Therefore, the same circumferential rotation of the drive pin relative to the plunger drive shaft and drive stack members that forces the diametrically opposed keyhole openings to move along the respective pairs of mutually inclined cooperating drive and reaction slots simultaneously forces the plunger drive shaft member to move along the device operational drive axis relative to the stationary drive stack member of the drive base for stretching the thin deformably resilient annular portion of the suction cup between the suction cup's center section at the foot portion of the plunger drive shaft member and its integral peripheral lip portion that is constrained adjacent to the peripheral lip portion of the bell housing member around the mouth of the cavity.

According to another aspect of the present suction cup device, the drive pin is optionally manipulated directly for circumferential rotation relative to the plunger drive shaft member and the drive stack member of the drive base, or by means of the handle when present.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

The terms "up" and "down" and derivatives are used solely for clarity in describing the invention and relate to the relative orientation of the individual components shown in the Figures and the assembly relative to a surface to which it is attached.

Figure 1:
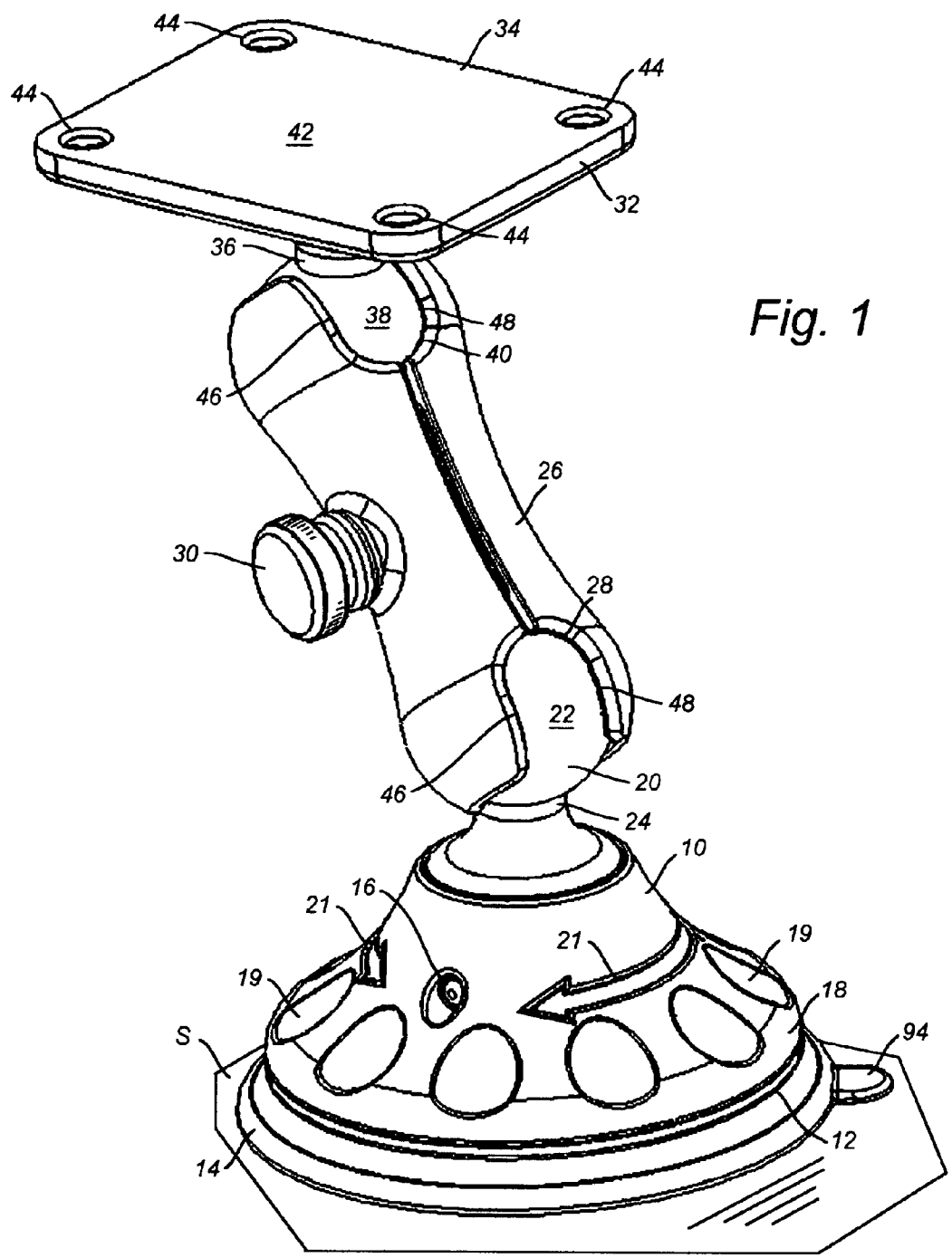
FIG. 1 is a pictorial view of the present invention embodied by example and without limitation as a suction cup device having a novel compact axially-driven suction cup installation and release mechanism.

FIG. 1 is a pictorial view of the present invention embodied by example and without limitation as a suction cup device 10 having a novel compact axially-driven suction cup installation and release mechanism. Accordingly, as shown more clearly in subsequent Figures, a substantially "bell" shaped drive base 12 and a suction cup plunger assembly 14 are coupled to each other with a rigid drive pin 16. The drive pin 16 also couples the drive base 12 and suction cup plunger assembly 14 to an optional rotational drive member or "handle" 18, which optionally includes one or both of a manual operating means 19 and one or more directional indicators 21.

The suction cup device 10 is intended to secure some device—a "utilization device"—to a surface. Therefore, a utilization mounting surface 20 is provided. By example and without limitation, the utilization mounting surface 20 is integrated with the drive base 12 which, in use, remains stationary relative to the suction cup plunger assembly 14 and an external mounting surface S. However, the utilization mounting surface 20 is optionally integrated with either the suction cup plunger assembly 14 or rotational drive member 18 without deviating from the scope and intent of the present invention. Alternatively, the utilization mounting surface 20 is a discrete unit separate from the other components but coupled thereto, also without deviating from the scope and intent of the present invention.

By example and without limitation, the utilization mounting surface 20 is structured as a sphere 22 of resiliently compressible material is presented on a substantially upright post 24, as described by example and without limitation by the inventor of the present invention in U.S. Pat. No. 5,845,885, which is incorporated by reference herein in its entirety. As illustrated in one or more figures herein and described by example and without limitation in U.S. Pat. No. 5,845,885, the sphere 22 of resiliently compressible material is presented on the substantially upright post 24 for access by a pair of clamping arms 26 that together form a socket 28 that is positionally secured relative to the sphere 22 when a clamping mechanism 30 is tightened. By example and without limitation, as shown and described herein, a positionable mounting platform 32 is founded on a base 34 that includes a substantially upright post 36 presenting thereon another sphere 38 of resiliently compressible material.

The second sphere 38 of resiliently compressible material is captured in a second socket 40 formed at an opposite end of the clamping arms 26 and is relatively positionally secured by increased tightening of the clamping mechanism 30. The positionable mounting platform 32 is optionally structured to support any of a variety of mobile devices or another device or structure of the user's choice. For example, a cradle for holding the mobile device or other device or structure is secured to a platform surface 42 with a quantity of screws or other fasteners through one or more mounting holes 44.

Optionally, as by example and without limitation in U.S. Pat. No. 5,845,885 and illustrated here, one or both of the presentation posts 24 and 36 is narrowed or "necked down" to pass between recessed lip portions 46 and 48 of the clamping arms 26 forming the sockets 28 and 40, as illustrated in one or more figures herein and described by example and without limitation in U.S. Pat. No. 5,845,885.

Alternatively, the utilization mounting surface 20 is structured as a pattern of one or more mounting holes raised above the operational features of the device. According to one embodiment of the invention, the utilization mounting surface 20 is formed external of the other components of the device 10 and spaced far enough therefrom to permit the compact axially-driven suction cup installation and release mechanism of the invention to fit their between.

Figure 2:
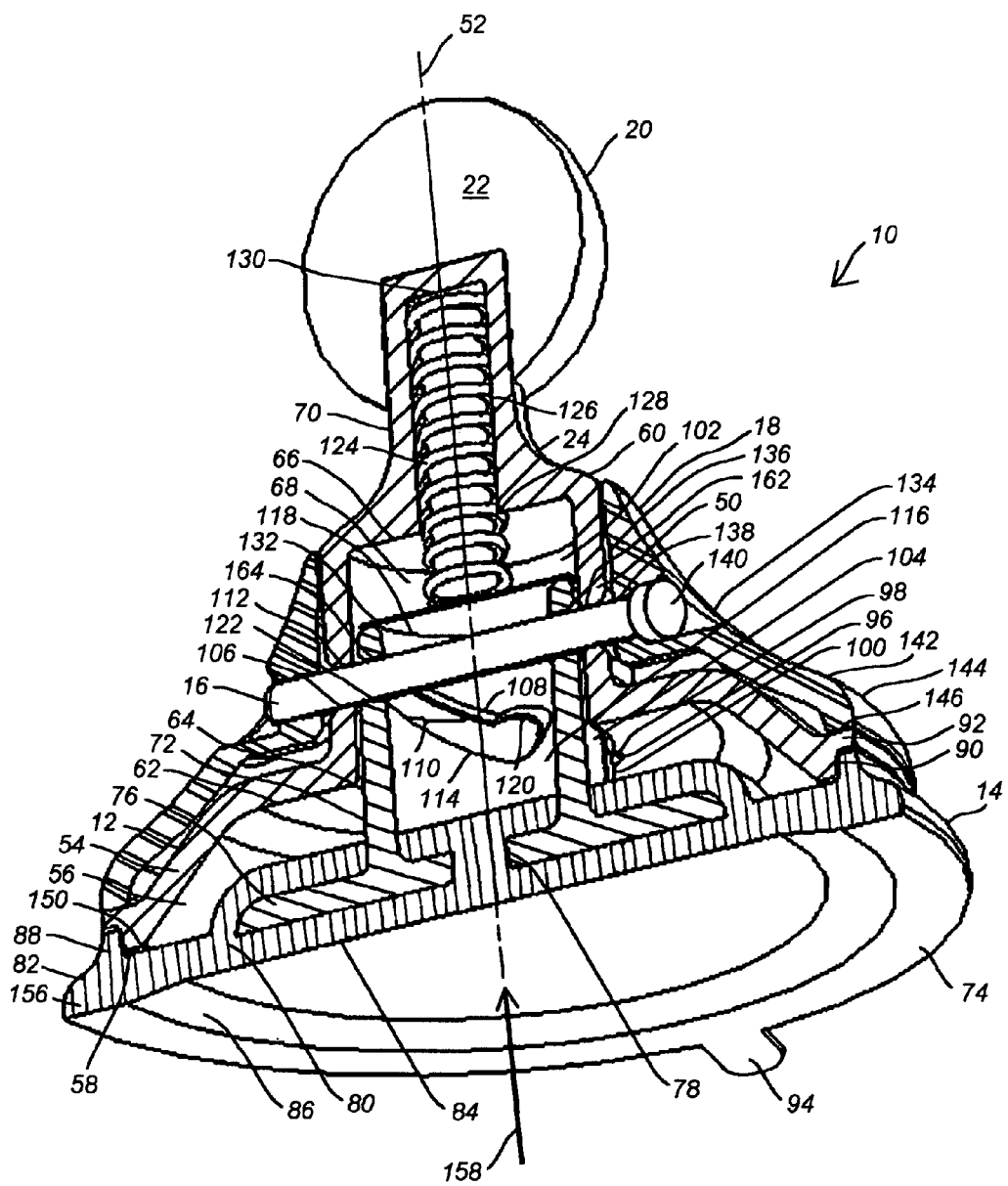
FIG. 2 is a partial cutaway view of the present suction cup device configured in a deactivated state having a compact axially-driven spiral suction cup installation and release mechanism configured in a released or "free" condition.

FIG. 2 is a partial cutaway view of the present suction cup device 10 configured in a deactivated state having a compact axially-driven spiral suction cup installation and release mechanism 50 configured in a released or "free" condition. Accordingly, the bell shaped drive base 12, suction cup plunger assembly 14 and optional rotational drive member 18, if present, are assembled substantially along an operational drive axis 52 with the drive pin 16 inserted substantially normal thereto.

The substantially "bell" shaped rigid drive base 12 is shown embodied by example and without limitation as a shallow dish-shaped bell housing 54 having a substantially wide and shallow concave recess or cavity 56 formed in a first "suction" surface 58 and a substantially upright drive stack 60 mounted external of the cavity 56. The concave cavity 56 is by example and without limitation formed with a shallow semi-spherical shape that is further truncated at its inner surface by a substantially planar floor portion 62. The concavity 56 is alternatively embodied as a shallow semi-spherical shape that maintains its curvature across the floor portion 62. According to another alternative embodiment, the concavity 56 is embodied as a shallow "funnel" shape that either maintains its shape to the floor portion 62, or is truncated at its inner surface by the substantially planar floor portion 62. The drive stack 60 is formed as a relatively narrow section of substantially hollow tube that is substantially axially aligned with the concave cavity 56 and communicates freely therewith through an axial aperture 64.

The utilization mounting surface 20 of the suction cup device 10 is provided by example and without limitation adjacent to one end of the drive stack 60 opposite from the cavity 56. By example and without limitation, a portion of the substantially upright presentation post 24 substantially closes the end of the tubular drive stack 60 opposite from the aperture 64 and forms a floor 66 thereof and forming a substantially cylindrical interior chamber 68 therein. The presentation post 24 is necked down external of the cylindrical chamber 68, and the sphere 22 of resiliently compressible material is presented on a necked down portion 70 thereof.

The suction cup plunger assembly 14 is formed around a substantially rigid tubular drive shaft 72 which is illustrated here by example and without limitation as being substantially tubular. Means are provided for coupling a suction cup 74 to one end of the tubular drive shaft 72. By example and without limitation, an integral disk-shaped foot portion 76 expands outwardly from the end of the column-shaped body of the tubular drive shaft 72. The circular foot portion 76 is provided with means 78 for adhering the moldable suction cup material thereto. For example, the adhering means 78 is embodied as a pattern of depressions in or holes through the foot portion 76. Alternatively, short columnar projections or "pins," mechanically roughened or chemically prepared surfaces, and other adhering means are also contemplated and may be substituted for adhering means 78 or used in different combinations without deviating from the scope and intent of the present invention.

The suction cup 74 is formed of a resiliently deformable material, such as silicone rubber, plastic or another elastically resilient material molded over the circular foot portion 76 of the drive shaft 72. Thus, the adhering means 78 is optional and provided only to improve and ensure adhesion of the molded suction cup material to the drive shaft foot portion 76. The suction cup 74 is provided with a resiliently deformable central suction portion 80 sized to be positioned within the concave cavity 56 of the drive base 12 and a larger peripheral lip portion 82 sized to extend outside of the cavity 56 and beyond the dish-shaped bell housing 54.

The deformable suction portion 80 of the suction cup 74 includes a relatively stiff round center section 84 formed of the elastically resilient material over molding the foot 76 of the drive shaft 72. The relatively stiff round center section 84 is surrounded by an integral thin deformably resilient annular portion 86 that extends to the integral peripheral lip portion 82. Here, the annular portion 86 is illustrated in a relaxed or unstretched condition because the suction cup device 10 illustrated as being configured in a released or "free" state.

According to one embodiment of the invention, means are provided between the suction cup 74 and the dish-shaped bell housing 54 to constrain the peripheral lip portion 82 from being drawn into the concave cavity 56 of the drive base 12 when, during operation, the drive shaft 72 is withdrawn through the aperture 64 into the chamber 68 of the tubular drive stack 60. By example and without limitation, the peripheral lip portion 82 of the suction cup 74 is formed with a thickened inner peripheral annular ring 88 of the elastically resilient material structured to cooperate with an annular groove 90 formed in a peripheral lip portion 92 of the dish-shaped bell housing 54 around the mouth of the cavity 56 adjacent to the first "suction" surface 58. The annular groove 90 cooperates with the thickened inner peripheral annular ring 88 of the suction cup 74 for keeping the peripheral lip 82 from being drawn into the concavity 56 during installation of the suction cup device 10.

Optionally, a tab 94 extends from the periphery of the peripheral lip portion 82 of the suction cup 74. When the suction cup 74 is attached to a surface S, manual lifting of the tab 94 by the operator eases release of the suction cup device 10.

Although less effective in operation than a rigid material, the drive shaft 72 is optionally molded of the plastic or other elastically resilient material from which the suction cup 74 is molded. Additionally, when molded of the same material as the suction cup 74, the drive shaft 72 is optionally molded integrally with the suction cup 74, and the foot portion 76 is eliminated.

The tubular drive shaft 72 portion of the suction cup plunger assembly 14 is sized to pass through the aperture 64 in the suction cup drive base 12 that communicates with the concave cavity 56 and into the cylindrical chamber 68 formed internally of the drive stack 60. The tubular drive shaft 72 is expected to be generally cylindrical in cross-section and is sized to slidingly engage the aperture 64 and cylindrical chamber 68 of the drive stack 60. However, other mating shapes for the plunger assembly's drive shaft 72 and the mating cylindrical chamber 68 are also contemplated and may be substituted without deviating from the scope and intent of the present invention.

The installation and release mechanism 50 is structured to operate effectively when the suction cup drive base 12 and tubular drive shaft 72 retain a substantially constant relative rotational orientation relative to the device operational drive axis 52. Therefore, the tubular drive shaft 72 is shaped to cooperate with the drive stack 60 for maintaining such substantially constant relative rotational orientation about the device operational drive axis 52, and thus remains rotationally oriented to the suction cup drive base 12 during operation. In the example shown, the drive stack 60 and mating drive shaft 72 are formed as substantially round tubes structured in a sliding fit so mutual revolution about the device operational drive axis 52 is possible. Accordingly, one or more guides 96 are formed between the tubular drive shaft 72 and the mating suction cup drive base 12. For example, the guides 96 are provided as one or more slots or keyways 98 and a same number of mating slides or keys 100 that are formed between tubular drive shaft 72 and the mating suction cup drive base 12. Here, by example and without limitation, a pair of the keyways 98 are recessed into opposite internal faces of tubular wall portion 102 forming the tubular drive stack 60, and a pair of the mating keys 100 are formed on a substantially tubular wall portion 104 forming the drive shaft 72. However, the relative locations of the keyways 98 and mating keys 100 are optionally reversed between the drive stack 60 and the drive shaft 72 without deviating from the scope and intent of the present invention.

Furthermore, the drive stack 60 and mating drive shaft 72 are alternatively formed as substantially square or rectangular tubes structured in a sliding fit only along the device operational drive axis 52, whereby mutual revolution about the device operational drive axis 52 is impossible. Accordingly, the guides 96 are provided as mating corners and wall features between the wall portion 104 forming the drive shaft 72 and the internal faces of the wall portion 102 forming the tubular drive stack 60.

The spiral suction cup installation drive mechanism 50 is also provided between the substantially upright drive stack 60 of the drive base 12 and the drive shaft 72 of the suction cup plunger assembly 14. By example and without limitation, the spiral installation drive mechanism 50 is provided by the installation drive pin 16 in combination with cooperating relatively inclined circumferential installation drive and reaction surfaces 106 and 108 that are formed between the substantially upright drive stack 60 of the drive base 12 and the drive shaft 72 of the suction cup plunger assembly 14. The circumferential installation drive and reaction surfaces 106, 108 cooperate through the drive pin 16 to force the drive shaft 72 of the plunger assembly 14 to move along the device operational drive axis 52 through the aperture 64 into and through the cylindrical chamber 68 of the drive stack 60, whereby the overmolded center section 84 of the suction cup 74 is pulled on the drive shaft foot portion 76 away from the mounting surface S to form a suction coupling therewith, as described herein.

Figure 4:
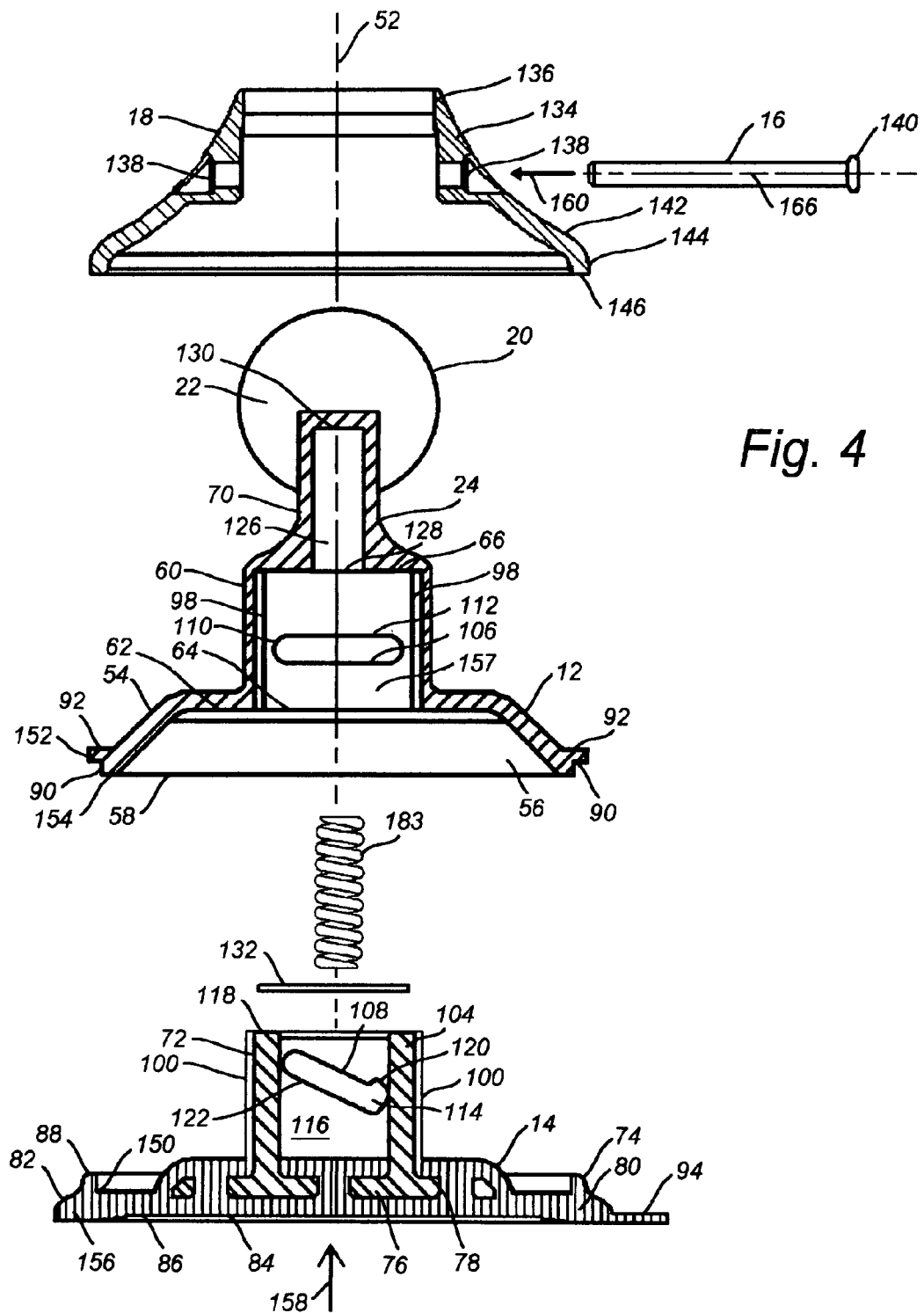
FIG. 4 is an exploded cross-sectional view that illustrates assembly of the novel suction cup device.

As better illustrated by example and without limitation in FIG. 4, the installation drive surface 106 is formed circumferentially through the tubular outer wall portion 102 of the drive stack 60 portion of the drive base 12, while the installation reaction surface 108 is formed circumferentially through the substantially tubular wall portion 104 forming the drive shaft 72. By example and without limitation, the installation drive surface 106 includes a pair of installation drive surfaces 106 which is provided as a pair of substantially symmetrical circumferential keyways or slots 110 formed through opposite faces of the outer wall portion 102 of the drive stack 60 diametrically opposed across the axial aperture 64. The circumferential drive slots 110 are sized to slidingly accept the drive pin 16 therethrough diametrically across the cylindrical chamber 68 of the drive stack 60. When the installation drive surfaces 106 are formed by circumferential slots 110, the drive slots 110 optionally also form a pair of circumferential release drive surfaces 112 opposite from the installation drive surfaces 106. By example and without limitation, the circumferential drive slots 110 are formed substantially perpendicular of the device operational drive axis 52, although as discussed herein, variations are also contemplated and may be substituted without deviating from the scope and intent of the present invention.

The cooperating circumferential installation reaction surface 108 are formed, by example and without limitation, as a pair of substantially symmetrical slots 114 formed circumferentially through opposite faces of the tubular wall portion 104 of the drive shaft 72 diametrically opposed across a substantially cylindrical chamber 116 formed therebetween. The circumferential reaction slots 114 are sized to slidingly accept the drive pin 16 therethrough diametrically across the cylindrical chamber 116 of the drive shaft 72 and are inclined relative to the device operational drive axis 52 and the keyways or slots 110 of the drive stack 60. The circumferential reaction slots 114 thus form a pair of the installation reaction surfaces 108 as spiral slots formed in the tubular wall portion 104 of the drive shaft 72 ascending from nearer the foot portion 76 toward an opposite distal end 118.

Optionally, the spiral installation drive mechanism 50 is also provided with anti-rotation "keeper" mechanism 120. For example, the keeper mechanism 120 is provided when the spiral installation reaction surfaces 108 are extended at their minimum elevation relative to the foot portion 76 of the drive shaft 72 in a "shelf" that is oriented either substantially perpendicular to the device operational drive axis 52 or canted at a slightly negative inclination relative to the respective installation reaction surface 108. The shelf-extension keeper mechanism 120 optionally forms a "saddle" as a shallow curve or "dish" shaped therein that cooperates with the drive pin 16 for providing the keeper mechanism 120. Irrespective of configuration, the installation drive pin 16 rests on the shelf-extension 120. When the shelf-extension 120 is negatively inclined or forms a saddle, as shown, it forms a detent between each installation reaction surface 108 and the respective shelf-extension 120 as an offset or a steeply negatively inclined plane (shown).

When the installation reaction surface 108 are formed by circumferential slots 114, the circumferential reaction slots 114 optionally also form a pair of release reaction surfaces 122 opposite from the installation reaction surfaces 108 and positioned for cooperating with corresponding release drive surfaces 112. The release drive and reaction surfaces 112, 122 cooperate through the drive pin 16 to force the drive shaft 72 of the plunger assembly 14 to move along the device operational drive axis 52 in an opposite direction from the installation drive and reaction surfaces 106, 108 through the aperture 64 and out of the cylindrical chamber 68 of the drive stack 60, whereby the overmolded center section 84 of the suction cup 74 is permitted to follow the drive shaft foot portion 76 toward the mounting surface S to relieve the suction coupling therewith, as described herein. Thus, the spiral installation drive mechanism 50 also constitutes a spiral release drive mechanism.

By example and without limitation, the circumferential reaction slots 114 are inclined relative to the device operational drive axis 52 and the circumferential drive keyways or slots 110 of the drive stack 60, whereby the installation reaction surface 108 are inclined relative to the corresponding cooperating installation drive surfaces 106 on same sides of the respective tubular wall portions 102 and 104 of the drive stack 60 and drive shaft 72, and the opposing release reaction surfaces 122 are similarly inclined relative to the corresponding cooperating release drive surfaces 112 on same sides of the respective tubular wall portions 102 and 104.

Alternatively, the inclined circumferential reaction slots 114 in the tubular wall portion 104 of the drive shaft 72 are instead formed substantially perpendicular of the device operational drive axis 52, while the cooperating circumferential drive keyways or slots 110 of the drive stack 60 are inclined relative to the device operational drive axis 52 and the substantially perpendicular circumferential reaction slots 114. However, optionally the circumferential reaction slots 114 in the tubular wall portion 104 of the drive shaft 72 and the cooperating circumferential drive slots 110 of the drive stack 60 are both inclined relative to the device operational drive axis 52 and each other without deviating from the scope and intent of the present invention.

Here, the drive pin 16 is illustrated as being positioned in the inclined circumferential reaction slots 114 adjacent to the end 118 of the drive shaft 72 distal from the foot portion 76 because the compact axially-driven spiral suction cup installation and release mechanism 50 of the present suction cup device 10 is configured here in the released or "free" state.

Figure 3:
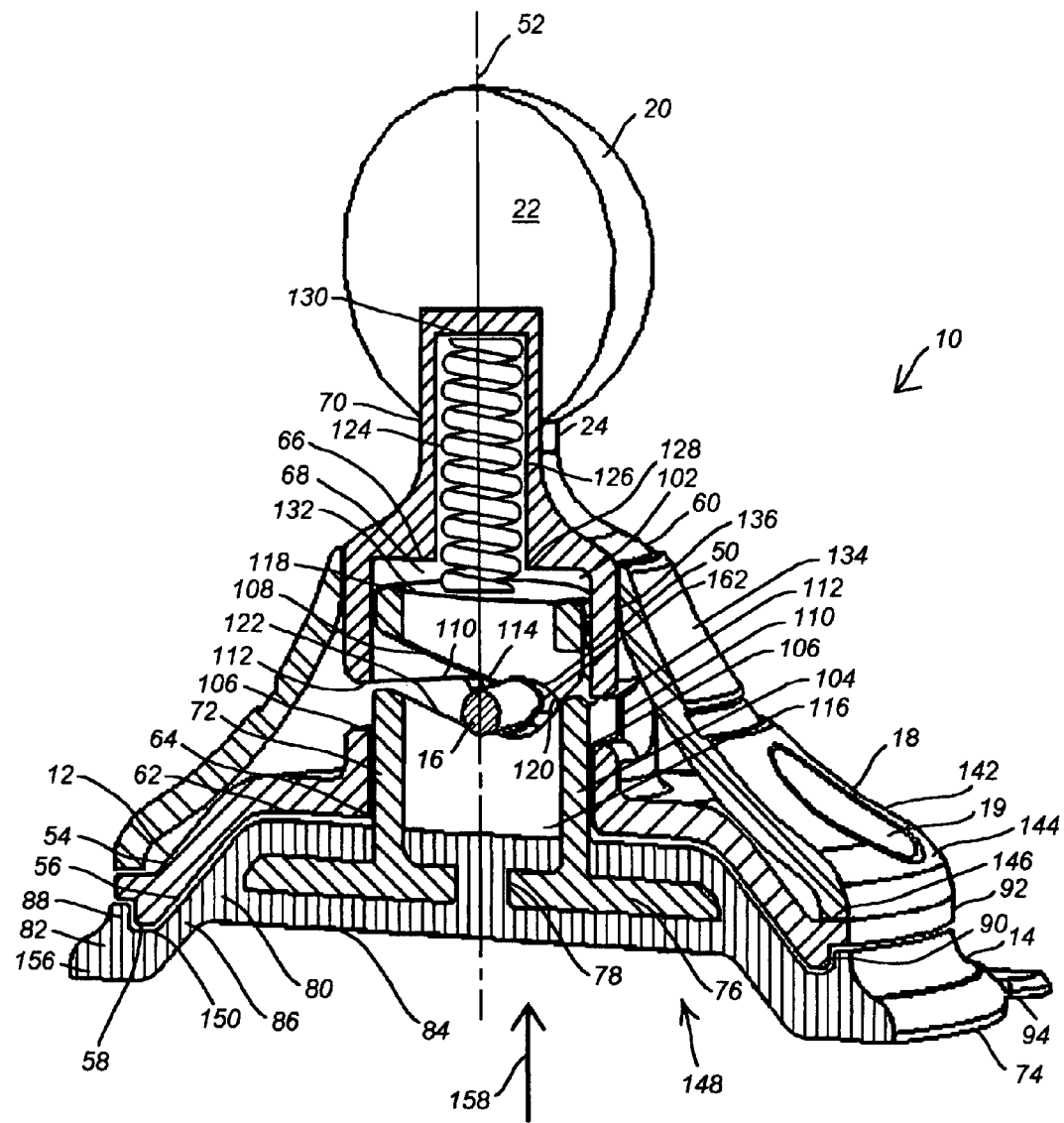
FIG. 3 is a partial cutaway view of the present suction cup device configured in an activated state having the compact axially-driven suction cup installation and release mechanism configured in an installed or "constrained" condition.

Optionally, a biasing mechanism 124 is positioned for urging the suction cup plunger assembly 14 away from a constrained relationship with the drive base 12, which exists when the present suction cup device 10 is configured in an activated state having the compact axially-driven suction cup installation and release mechanism configured in an installed or "constrained" condition, as illustrated in FIG. 3. Accordingly, the biasing mechanism 124 is positioned for urging the suction cup 74 portion of the plunger assembly 14 generally out of the concavity 56 of the drive base 12.

By example and without limitation, the biasing mechanism 124 is structured to urge the drive shaft 72 of the plunger assembly 14 to move along the device operational drive axis 52 through the aperture 64 and out of the cylindrical chamber 68 of the drive stack 60, whereby the overmolded center section 84 of the suction cup 74 is permitted to follow the drive shaft foot portion 76 toward the mounting surface S to relieve the suction coupling therewith, as described herein. Thus, the biasing mechanism 124 aids the spiral installation and release mechanism 50 to relieve the suction coupling with the mounting surface S. Here, by example and without limitation, the biasing mechanism 124 is provided as a conventional compression spring positioned between the plunger assembly's drive shaft 72 and the drive stack 60 of the drive base 12. For example, the spring or other biasing mechanism 124 is slidingly received into an optional second cylindrical chamber 126 formed in the presentation post 24 of the utilization mounting surface 20 that communicates with the chamber 68 of the tubular drive stack 60 along the device operational drive axis 52 through an aperture 128 in the floor 66 thereof. Else, the cylindrical chamber 68 is optionally extended within the drive stack 60 to provide space for the spring or other biasing mechanism 124, if present.

The spring or other biasing mechanism 124 is selected to extend from an inner or floor portion 130 of the second cylindrical chamber 126 out through the aperture 64 and into of the cylindrical chamber 68 with sufficient length remaining before attaining its fully extended relaxed state to press against the end 118 of the drive shaft 72 with sufficient spring force the suction cup 74 of the plunger assembly 14 outward of the cavity 56 in the bell housing 54 of the drive base 12.

When the end 118 of the drive shaft 72 is open into the cylindrical chamber 116, as illustrated, an optional plate or disk 132 of substantially rigid material is optionally emplaced to constrain the spring or other biasing mechanism 124 between the end 118 of the drive shaft 72 and the inner or floor portion 130 of the cylindrical chamber 126 within the presentation post 24. Else, the spring or other biasing mechanism 124 is sized to interface with the end 118 of the drive shaft 72 and fit within the space provided by an extended cylindrical chamber 68. In either configuration, interference between the spring or other biasing mechanism 124 and the drive pin 16 is thus avoided.

The pressure of the spring or other biasing mechanism 124 tends to urge the drive shaft 72 of the plunger assembly 14 to slide outwardly of the cylindrical chamber 68 in the drive stack 60. Such spring pressure thus loads the drive pin 16 in shear between the circumferential reaction slots 114 in the drive shaft 72 and the corresponding circumferential drive slots 110 of the drive stack 60. The drive slots 110 and corresponding reaction slots 114 thus tend to grip the drive pin 16 in a scissors hold between the drive shaft 72 and the drive stack 60. The resultant gripping action is normally sufficient to restrain the drive pin 16 from sliding or "walking" out of the drive slots 110 and corresponding reaction slots 114.

In operation, the drive pin 16 is optionally rotated directly about the device operational drive axis 52 for operating the compact axially-driven spiral suction cup installation and release mechanism 50 of the present suction cup device 10. As discussed herein, rotation of the drive pin 16 is about the device operational drive axis 52 causes the drive shaft 72 of the plunger assembly 14 to slide inwardly of the cylindrical chamber 68 in the drive stack 60, whereby the overmolded center section 84 of the suction cup 74 drawn on the drive shaft foot portion 76 into the cavity 56 in the bell housing 54 of the drive base 12 for forming the suction coupling with the mounting surface S, as described herein.

However, the rotational drive member or "handle" 18 is optionally provided for convenience and appearance. The handle 18 is also structured to protect the drive pin 16 from jostling and inadvertent dislodgment from its position between the drive slots 110 and corresponding reaction slots 114. By example and without limitation, the handle 18 includes at least a collar portion 134 formed with an inner tubular walled aperture 136 sized to slide over the outer wall portion 102 forming the tubular drive stack 60 of the bell shaped drive base 12. The inner tubular wall 136 is sized sufficiently loosely to freely spin the collar portion 134 about the drive stack outer wall portion 102. Furthermore, the collar 134 includes substantially symmetric diametrically opposed crosswise apertures 138 piercing the inner tubular wall 136 along a diameter thereof. The crosswise apertures 138 are sized to slidingly receive the drive pin 16 therethrough, although one or both apertures 138 may be slightly undersized to grip the drive pin 16 and constrain it from backing out during repeated operations of the suction cup device 10. One or both of the apertures 138 is optionally formed with a countersink or counter-bore (shown) to receive a head portion 140 of the drive pin 16 into the collar 134.

Optionally, the handle 18 includes a skirt portion 142 extended from the collar portion 134 and flowing over but detached from the shallow dish-shaped bell housing 54 of the drive base 12. When present, the skirt portion 142 includes an annular hem portion 144 opposite from the collar portion 134 and having a substantially planar lip 146 structured to follow the peripheral lip portion 92 of the dish-shaped bell housing 54 around the mouth of the cavity 56. As best illustrated by example and without limitation in FIG. 1, when present, the manual operating means 19 is optionally provided on either the collar portion 134 or skirt portion 142 for easier manipulation by the user. By example and without limitation, the manual operating means 19 (FIG. 1) is provided as a pattern of finger grips formed in the collar 134 or skirt portion 142 for ease in rotating the handle 18 and with it the drive pin 16. By example and without limitation, the finger grip operating means 19 are formed as finger-tip sized indentations recessed into the skirt portion 142 adjacent to its hem 144. The manual operating means 19 alternatively take other convenient and ornamental shapes than the finger grips and may be substituted without deviating from the scope and intent of the present invention.

When present, the one or more directional indicators 21 (FIG. 1) are also provided on the collar 134 or skirt portion 142 for indicating device installation and release directions of rotation of the handle 18. By example and without limitation, a pair of the directional indicators 21 are illustrated here as pictographic directional indicators having arrow shapes recessed into opposite sides of the skirt portion 142 adjacent to the finger grip operating means 19. Alternatively, the directional indicators 21 are textual directions, such as "ON" and "OFF," without deviating from the scope and intent of the present invention. Optionally, both pictographic and textual directional indicators 21 may be provided, for example, with the textual directional indicators 21 adjacent to the pictographic directional indicators 21, as illustrated by example and without limitation by the inventor of the present invention in U.S. Pat. No. 6,666,420, which is incorporated herein by reference. Accordingly, during operation clockwise or counter-clockwise forces are exerted by the user's fingertips in the finger grips 19 for rotating the rotational drive member or "handle" 18 about the device operational drive axis 52 in the directions indicated by the pictographic and/or textual directional indicators 21. The drive pin 16 is responsively rotated relative to the cooperating slots 110 and 114 of the respective drive stack 60 and drive shaft 72 for moving the drive shaft 72 relative to the drive stack 60 along the operational drive axis 52, as disclosed herein.

FIG. 3 is a partial cutaway view of the present suction cup device 10 configured in an activated state having the compact axially-driven suction cup installation and release mechanism configured in an installed or "constrained" condition. Accordingly, the bell shaped drive base 12, suction cup plunger assembly 14 and rotational drive member or "handle" 18 are assembled substantially along the operational drive axis 52 with the drive pin 16 inserted substantially normal thereto. The drive pin 16 is inserted through the cooperating slots 110 and 114 of the drive stack 60 and drive shaft 72, respectively, adjacent to the respective installation drive and reaction surfaces 106 and 108. When the handle 18 is present, the drive pin 16 is simultaneously inserted through the cooperating crosswise apertures 138 of its collar portion 134.

In operation, the handle 18 is rotated to rotate the drive pin 16 about the device operational drive axis 52 into a position within the inclined circumferential reaction slots 114 (or drive slots 110) spaced a maximum distance from the foot portion 76 of the drive shaft 72 and the suction cup 74. The drive shaft 72 and drive stack 60 are constrained against relative revolution about the device operational drive axis 52 by the guides 96. Therefore, as illustrated in FIG. 2, this extreme positioning of the drive pin 16 relative to the inclined reaction slots 114 (or drive slots 110) causes the drive shaft 72 of the plunger assembly 14 to slide along the device operational drive axis 52 outwardly of the cylindrical chamber 68 in the drive stack 60 to a maximum degree. This extreme motion of the drive shaft 72 relative to the drive stack 60 causes the drive shaft's foot portion 76 to move outwardly of the cavity 56 in the suction surface 58 of the drive base bell housing 54. Substantially all tension in the suction cup 74 is thereby relieved. However, the annular groove 90 in the peripheral lip portion 92 of the dish-shaped bell housing 54 around the mouth of the cavity 56 cooperates with the thickened inner peripheral annular ring 88 of the suction cup 74 for maintaining substantial concentricity of the suction cup 74 relative to the bell housing 54 of the drive base 12. Pressure of the spring or other biasing mechanism 124 effectively restrains the drive pin 16 from sliding or "walking" out of the cooperating circumferential drive and reaction slots 110 and 114.

With the rotational drive member or "handle" 18 thus rotated to relieve pressure between the installation drive pin 16 and the cooperating relatively inclined drive and reaction slots 110 and 114, the peripheral lip portion 82 of the relaxed suction cup 74 is placed against the mounting surface S to which is to be attached. When the operator is satisfied with the position of the suction cup device 10 relative to the attachment surface S, a torque load is applied via the finger grips 19 of the rotational drive member or "handle" 18 to rotate the drive pin 16 about the device operational drive axis 52 in an "ON" direction, which is optionally indicated by the pictographic and/or textual directional indicators 21. The drive pin 16 is thus rotated relative to the cooperating circumferential drive and reaction slots 110 and 114 against the respective circumferential installation drive and reaction surfaces 106 and 108.

During rotation, the installation drive pin 16 interfaces with the horizontal or downwardly ramping axial installation drive surfaces 106 in the tubular drive stack 60 of the suction cup drive base 12 and the upwardly ramping axial installation reaction surface 108 in the drive shaft 72 of the suction cup plunger assembly 14. Continued application of the torque load to the rotational drive member 18 causes the installation drive pin 16 to travel circumferentially along both the installation drive surfaces 106 and the relatively inclined installation reaction surfaces 108. The relative inclination between the installation drive and reaction surfaces 106 and 108 forces the drive shaft 72 to move along the device operational drive axis 52 relative to the drive stack 60 when the drive pin 16 is moved. In other words, as the drive pin 16 travels circumferentially along the installation drive surfaces 106, the relatively inclined installation reaction surfaces 108 are simultaneously ramped downwardly over the drive pin 16 toward the foot portion of the drive shaft 72. However, the drive shaft 72 of the suction cup plunger assembly 14 is constrained by the guides 96, i.e., mating keyways 98 and keys 100 or other structural features, to move relative to the tubular drive stack 60 of the suction cup drive base 12 only along the device operational drive axis 52 without relative rotation. Therefore, circumferential motion of the drive pin 16 along the relatively inclined installation reaction surfaces 108 simultaneously forces the drive shaft 72 axially upwardly along the device operational drive axis 52 into the cylindrical chamber 68 of the drive stack 60. The foot portion 76 is carried upwardly along the device operational drive axis 52 as part of the drive shaft 72. The center section 84 of the suction cup 74 to his drawn upwardly with the foot portion 76 into the concavity 56 and away from the external attachment surface S. Meanwhile, the peripheral housing lip 92 manually maintains shape and position of the suction cup peripheral lip 82 external to the concavity 56. In effect, circumferential motion of the drive pin 16 along the relatively inclined installation drive and reaction surfaces 106 and 108 pulls the drive shaft 72 of the plunger assembly 14 along the device operational drive axis 52 through the axial aperture 64 into the cylindrical chamber 68 of the drive stack 60. The same circumferential motion of the drive pin 16 along the relatively inclined installation drive and reaction surfaces 106 and 108 simultaneously pulls the drive shaft's foot portion 76 through the concavity 56 away from the suction surface 58 of the drive base bell housing 54. The overmolded center section 84 of the suction cup 74 is simultaneously pulled on the drive shaft foot portion 76 away from the mounting surface S to initiate formation of a suction coupling therewith.

As insertion of the plunger assembly's drive shaft 72 within the drive stack's interior chamber 68 increases, the portion within the concavity 56 shortens. The thin deformably resilient annular portion 86 of the suction cup 74 is forced to stretch between the withdrawing center section 84 and the positionally fixed peripheral lip 82. Meanwhile, interaction with the annular groove 90 of the drive base housing's lip 92 operates to seal the peripheral lip 82 of the suction cup 74 flush against the attachment surface S, whereby an airtight cavity 148 is formed between the suction cup 74 and the attachment surface S wherein a partial vacuum is formed relative to ambient atmospheric pressure.

As discussed herein, means are provided between the suction cup 74 and the dish-shaped bell housing 54 of the drive base 12 for constraining the peripheral lip portion 82 from being drawn into the concave cavity 56 of the suction surface 58 when, during operation, the plunger drive shaft 72 is withdrawn through the aperture 64 into the chamber 68 of the tubular drive stack 60. By example and without limitation, the peripheral lip portion 82 of the suction cup 74 is formed as an annular ring of the elastically resilient material structured to cooperate with the annular groove 90 formed in the peripheral lip portion 92 surrounding the mouth of the cavity 56 adjacent to the suction surface 58 for keeping the peripheral lip 82 from being drawn into the concavity 56 during installation of the suction cup device 10. Accordingly, the lip portion 82 of the suction cup 74 includes the thickened inner peripheral annular ring 88 that forms an annular "shelf" 150 structured to fit within the annular groove 90 between respective substantially concentric outwardly and downwardly projections 152, 154. The integral peripheral lip 82 may extend outwardly in a thickened concentric outer annular ring portion 156 having a cross-section of sufficient thickness to avoid curling during installation of the suction cup device 10, thereby effectively increasing the suction cup footprint and the holding power of the suction cup device. In operation, the annular groove 90 captures the thick peripheral annular ring 88 portion of the suction cup lip 82. The downward projecting portion 154 of the housing lip 92 keeps the suction cup lip 82 from being drawn into the concavity 56 during installation of the suction cup device 10, while the outwardly projecting portion 152 helps to keep the suction cup lip 82 from curling.

Rotation of the axially-driven rotational drive member 18 ceases when the drive pin 16 encounters the ends of one or both of the circumferential drive and reaction slots 110 and 114. Other rotational stops may be provided when the installation drive and reaction surfaces 106 and 108 are not provided as respective drive and reaction slots 110 and 114.

The drive pin 16 is constrained in this position relative to the circumferential drive and reaction slots 110 and 114 by the anti-rotation keeper mechanism 120, whereby the drive pin 16 is settled on the saddle behind the detent 81, as shown, at minimum spacing from the foot portion 76 of the drive shaft 72, which ensures maximum elevation of the center section 84 of the suction cup 74 relative to the suction surface 58 of the drive base bell housing 54. Passing the drive pin 16 over the optional detent 81, as well as the tension generated in the stretched annular portion 86 of the suction cup 74, ensures that the drive pin 16 cannot back down the inclined reaction drive surfaces 108.

Simultaneously withdrawal of the plunger assembly's drive shaft 72 into the drive stack's interior chamber 68, the spring or other biasing mechanism 124 is compressed along the device operational drive axis 52 within the cylindrical chamber 126 of the presentation post 24 between the floor portion 130 thereof and the end 118 of the drive shaft 72. As disclosed herein, when the end 118 of the drive shaft 72 is open into the cylindrical chamber 116, as illustrated, the plate or disk 132 is optionally emplaced to constrain the spring or other biasing mechanism 124 between the end 118 of the drive shaft 72 and the inner or floor portion 130 of the cylindrical chamber 126 to avoid interference with the drive pin 16.

The suction cup device 10 is released from the attachment surface by release of the relative vacuum within the suction cup 74. This is accomplished by collapsing the airtight cavity 148 by driving the center 84 of the suction cup 74 downwardly to the attachment surface, whereby tension in the stretched deformably resilient annular portion 86 is released and the suction cup 74 returns to its relaxed condition. The center 84 of the suction cup 74 is driven downwardly by interaction of the drive pin 16 with the cooperating release drive and reaction surfaces 112 and 122 when the torque load is applied to rotate the drive member 18 in a release direction, as indicated by the optional directional indicators 21, when present. For example, a released torque load is applied to the optional finger grip or other operating means 19, when present, of the rotational drive member or "handle" 18. Force by the drive pin 16 moving upwardly along the cooperating release drive and reaction surfaces 112 and 122 combines with the elasticity of the stretched deformably resilient annular portion 86 material of the suction cup 74 to push the plunger drive shaft 72 down along the device operational drive axis 52 through the axial aperture 64 into the concavity 56. When the upward force on the plunger drive shaft 72 is completely removed so that the suction cup 74 is relaxed, the relative vacuum in airtight cavity 148 holding the suction cup device 10 against the attachment surface S is released. Thereafter, the device 10 can be moved by lifting the tab 94, which breaks the airtight seal between the suction cup's peripheral lip 82 and the attachment surface S.

FIG. 4 is an exploded cross-sectional view that illustrates assembly of the novel suction cup device 10. If present, the optional rotational drive member or "handle" 18 is fit over the bell shaped drive base 12 along the device operational drive axis 52.

If present, the optional spring or other biasing mechanism 124 is fit into either the second cylindrical chamber 126 within the presentation post 24, or the extended length of the cylindrical chamber 68 of the drive stack 60. If the optional spring or other biasing mechanism 124 is present and smaller than the end 118 of the drive shaft 72, the optional plate or disk 132 of substantially rigid material is fit between the biasing mechanism 124 and the drive shaft end 118 before the drive shaft 72 is inserted through the aperture 64 and into the cylindrical chamber 68 of the drive stack 60 with the end 118 thereof facing toward the floor 66 thereof. Else, if the optional spring or other biasing mechanism 124 is present and is sized to interface with the end 118 of the drive shaft 72, the drive shaft 72 is optionally inserted through the aperture 64 and into the cylindrical chamber 68 of the drive stack 60 with the end 118 thereof directly interfacing with the biasing mechanism 124.

The guides 96 between tubular drive shaft 72 and the mating tubular drive stack 60 of the suction cup drive base 12 are aligned with the one or more slides or keys 100 mating with corresponding slots or keyways 98. The drive shaft 72 is pushed into the cylindrical chamber 68 of the drive stack 60. If present, the biasing mechanism 124 is simultaneously compressed within the cylindrical chamber 126 of the presentation post 24, or within the extended cylindrical chamber 68 of the drive stack 60. Inserting the drive shaft 72 is pushed into the cylindrical chamber 68 of the drive stack 60 substantially automatically centers the peripheral annular ring 88 of the suction cup 74 relative to the cooperating annular groove 90 surrounding the mouth of the cavity 56 adjacent to the first suction surface 58. As the peripheral annular ring 88 of the suction cup 74 approaches the first suction surface 58 of the drive base 12, the downward projecting portion 154 of the housing lip 92 fits inside the annular shelf portion 150, while the outwardly projecting portion 152 interfaces with its top surface. The larger peripheral lip portion 82 of the suction cup 74 extends outside of the cavity 56 and beyond the dish-shaped bell housing 54.

The guides 96 between tubular drive shaft 72 and the mating tubular drive stack 60 of the suction cup drive base 12 cause the cooperating drive and reaction slots 110 and 114 to be aligned along the device operational drive axis 52. Pressure (indicated by arrow 158) is applied, as to the center portion 84 of the suction cup 74, to hold the assembled plunger assembly 14 together with the drive base 12. The drive pin 16 is pushed through a first of the crosswise apertures 138 in the collar 134 of the handle 18. Two methods are recognized for installing the drive pin 16. According to one method, the pressure (indicated by arrow 158) is applied to plunger assembly 14 along the device operational drive axis 52 until the cooperating circumferential drive and reaction slots 110 and 114 intersect along an axis (indicated by arrow 160) oriented substantially normal to the device operational drive axis 52. The handle 18 is rotated on the drive base 12 about the device operational drive axis 52 until the drive pin 16 encounters the axis of intersection (indicated by arrow 160) between the cooperating circumferential drive and reaction slots 110 and 114, whereupon the drive pin 16 is pushed through a keyhole opening 162 (e.g., FIGS. 2, 3) that results between the respective side walls 102 and 104 of the tubular drive stack 60 and drive shaft 72 along the axis of intersection (indicated by arrow 160) of the cooperating drive and reaction slots 110 and 114. The drive pin 16 is passed through the chamber 116 within the drive shaft 72 and through another keyhole opening 164 (e.g., FIG. 2) in the respective side walls 102 and 104 of the tubular drive stack 60 and drive shaft 72 also along the axis of intersection (indicated by arrow 160) but diametrically opposite from the first opening 162. The second keyhole opening 164 also results from the intersection of the cooperating drive and reaction slots 110 and 114 and lies along the axis of intersection (indicated by arrow 160). The keyhole opening 164 is substantially aligned with the second of the crosswise apertures 138 in the collar 134 of the handle 18 on an opposite side of the device 10 from the first crosswise aperture 138, and the drive pin 16 is then passed into and through the second of the crosswise apertures 138.

According to a second method for installing the drive pin 16, the handle 18 is rotated on the drive base 12 about the device operational drive axis 52 only until the drive pin 16 encounters one of the drive slots 110 in the side wall 102 of the tubular drive stack 60. Thereafter, light pressure is applied to the drive pin 16 along its longitudinal axis 166 normal to the device operational drive axis 52. The pressure (indicated by arrow 158) applied to plunger assembly 14 along the device operational drive axis 52 is alternately increased or decreased appropriately until the axis of intersection (indicated by arrow 160) between the cooperating drive and reaction slots 110 and 114 coincides with the longitudinal axis 166 of the drive pin 16. This coincidence of the axis of intersection (indicated by arrow 160) with the drive pin longitudinal axis 166 occurs when the drive shaft 72 is positioned relative to the drive stack 60 along the device operational drive axis 52 such that the reaction slot 114 intersects the with the longitudinal axis 166 of the drive pin 16. The pressure (indicated by arrow 158) applied to plunger assembly 14 is held steady while the drive pin 16 is pushed through an opening in the respective side walls 102 and 104 of the tubular drive stack 60 and drive shaft 72 along the axis of intersection (indicated by arrow 160) that results from the intersection of the cooperating drive and reaction slots 110 and 114. The drive pin 16 is passed through the chamber 116 within the drive shaft 72 and through another opening in the respective side walls 102 and 104 of the tubular drive stack 60 and drive shaft 72 also along the axis of intersection (indicated by arrow 160) but opposite from the first opening and also resulting from the intersection of the cooperating drive and reaction slots 110 and 114. The drive pin 16 is then passed into and through the second of the crosswise apertures 138 in the collar 134 of the handle 18 on an opposite side of the device 10 from the first crosswise aperture 138. According to either assembly method, the pressure (indicated by arrow 158) applied to plunger assembly 14 is relieved, which permits the suction cup 74 to return to its relaxed state. The novel suction cup device 10 is ready for action.

Figure 5:
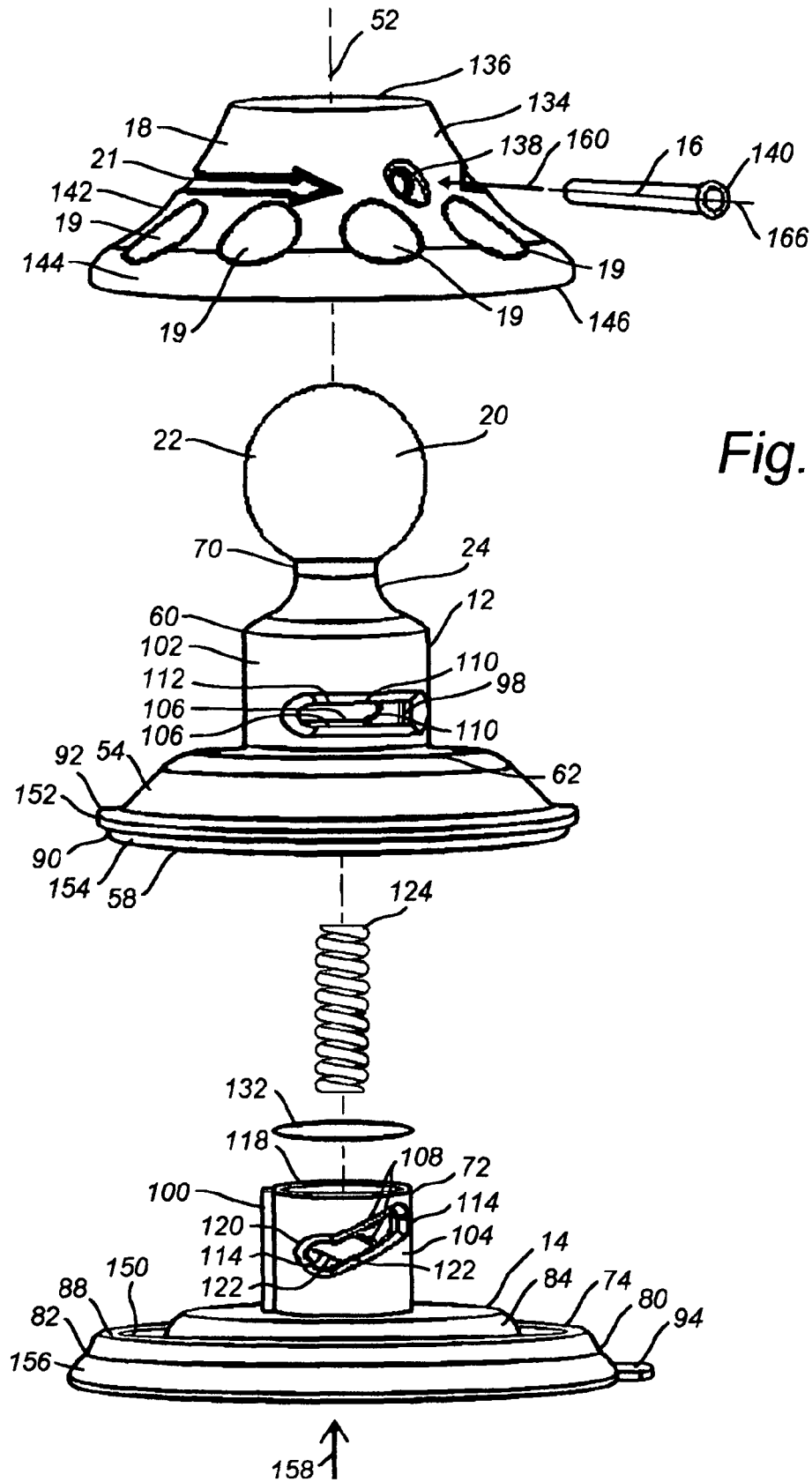
FIG. 5 is an exploded view that illustrates assembly of the novel suction cup device.

FIG. 5 is an exploded view that illustrates assembly of the novel suction cup device 10. As disclosed herein, if present the optional rotational drive member or "handle" 18 is fit over the bell shaped drive base 12 along the device operational drive axis 52. The optional spring or other biasing mechanism 124 is compressed between the optional plate or disk 132 or the end 118 of the drive shaft 72. The guides 96 in the form of one or more slides or keys 100 mating with corresponding slots or keyways 98 align the plunger drive shaft 72 and mating tubular drive stack 60 of the suction cup drive base 12. The drive shaft 72 is pushed into the drive stack 60 of the drive base 12 by application of pressure (indicated by arrow 158) along the device operational drive axis 52, which simultaneously compresses the biasing mechanism 124 therebetween. The drive pin 16 is inserted through the crosswise apertures 138 in the collar 134 of the handle 18 along the axis of intersection (indicated by arrow 160) between the cooperating drive and reaction slots 110 and 114. The pressure (indicated by arrow 158) applied to plunger assembly 14 is relieved, whereupon the suction cup 74 returns to its relaxed state and the novel suction cup device 10 is ready for action.

Figure 6:
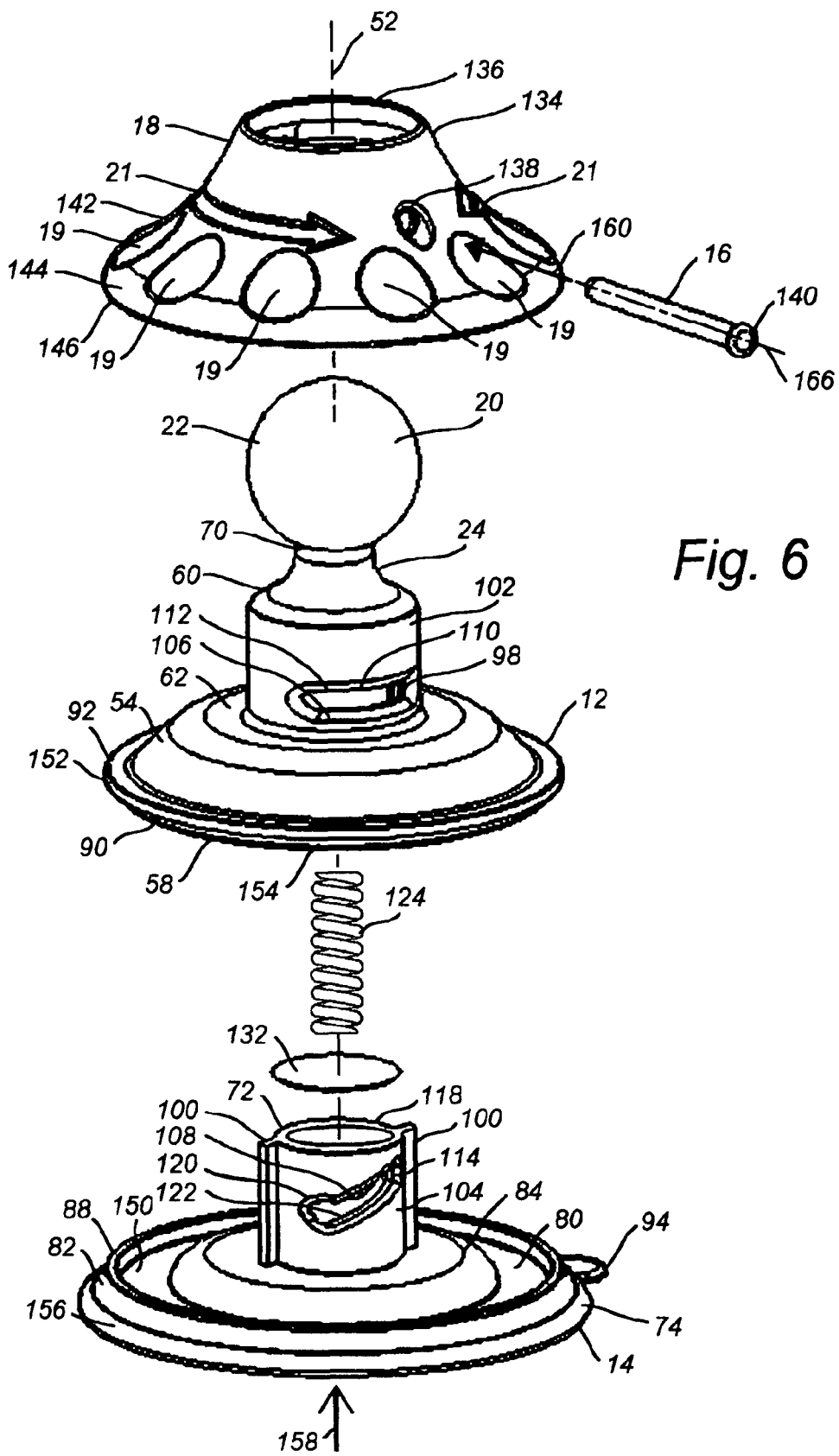
FIG. 6 is an overhead exploded pictorial view that also illustrates assembly of the novel suction cup device.

FIG. 6 is an overhead exploded pictorial view that also illustrates assembly of the novel suction cup device 10. Here, the inner tubular walled aperture 136 of the handle collar portion 134 is shown to be sized to fit over the sphere 22 and upright post 24 of the utilization mounting surface 20 and spin freely about the drive stack outer wall portion 102.

Figure 7:
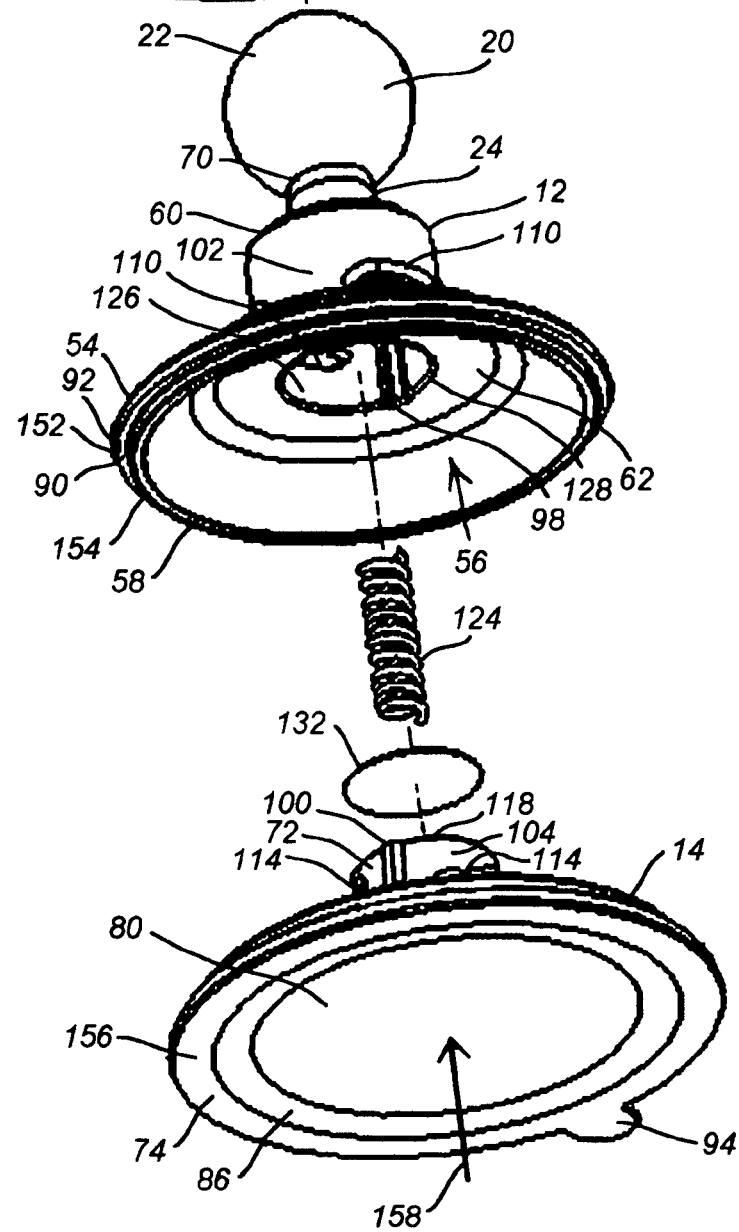
FIG. 7 is an underneath exploded pictorial view that also illustrates assembly of the novel suction cup device.

FIG. 7 is an underneath exploded pictorial view that also illustrates assembly of the novel suction cup device 10. Here, the guides 96 are formed between the tubular drive shaft 72 and the mating suction cup drive base 12. For example, are provided as one or more slots or mating keyways 98 and keys 100 the guides 96 are illustrated for initially aligning the tubular drive shaft 72 with the mating suction cup drive base 12 and subsequently maintaining alignment therebetween. Here, by example and without limitation, the keyways 98 are recessed into opposite internal faces of an outer wall portion 102 forming the tubular drive stack 60, and the mating keys 100 are formed on the wall portion 104 of the tubular drive shaft 72.

Figure 8:
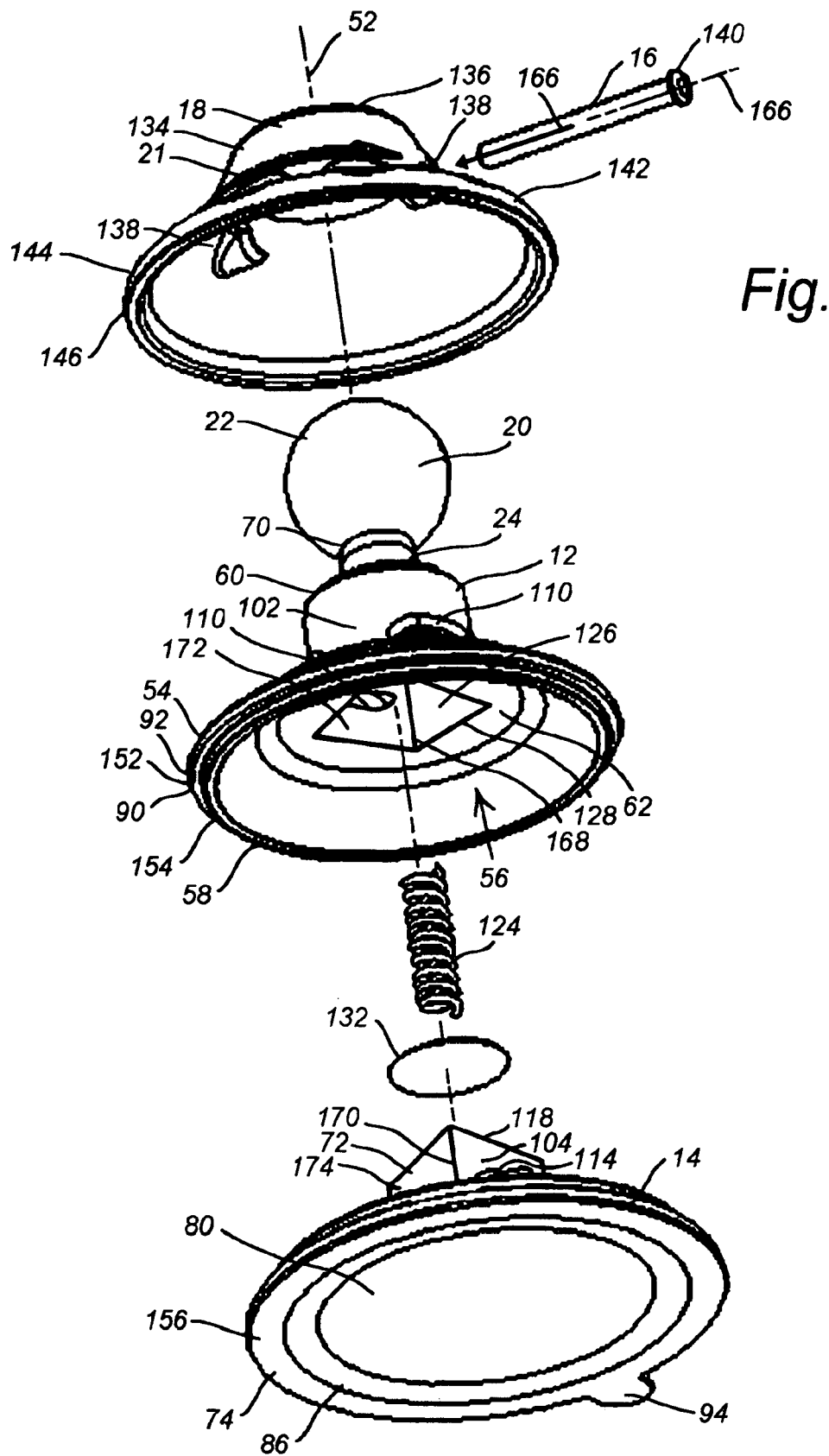
FIG. 8 is another underneath exploded pictorial view that illustrates assembly of the novel suction cup device, wherein an outer wall portion of a tubular drive stack member, and a cooperating wall portion of a tubular drive shaft member are alternatively formed with optional mating nonround shapes.
Figure 9:
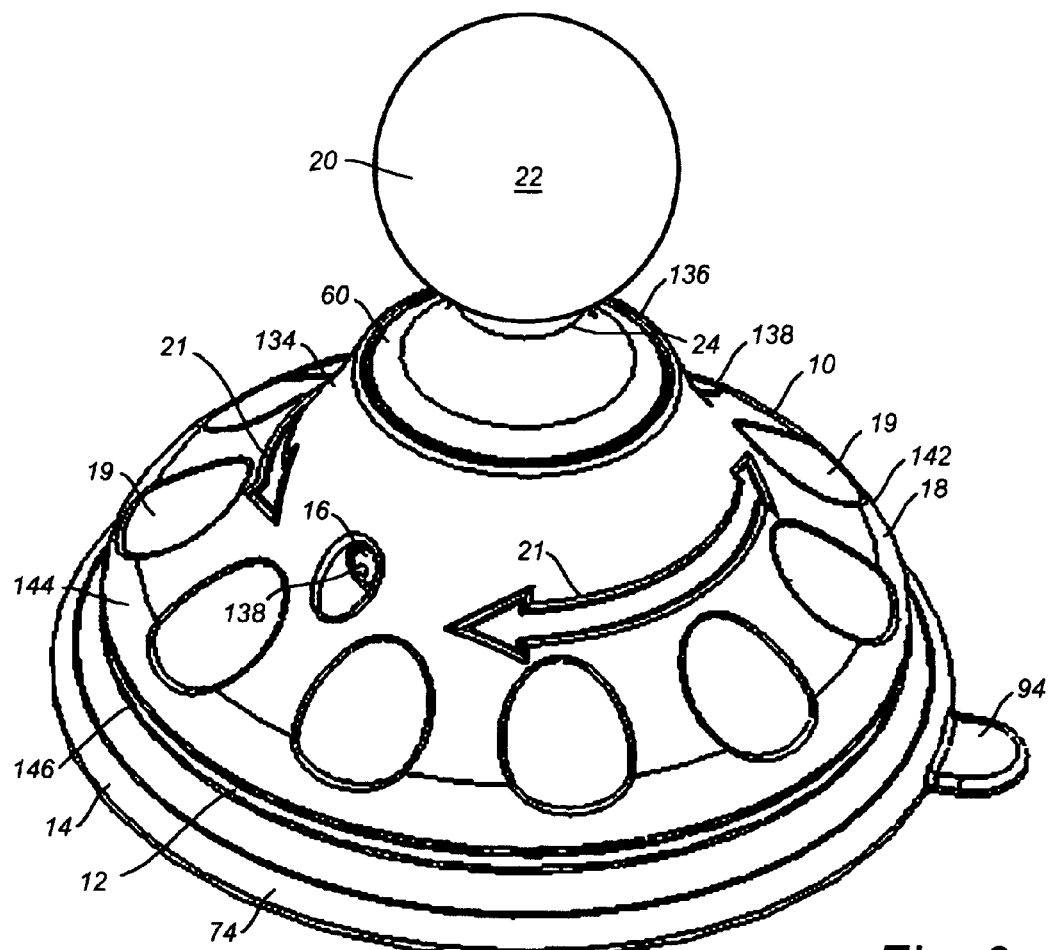
FIG. 9 is an overhead pictorial view of the novel suction cup device.
Figure 10:
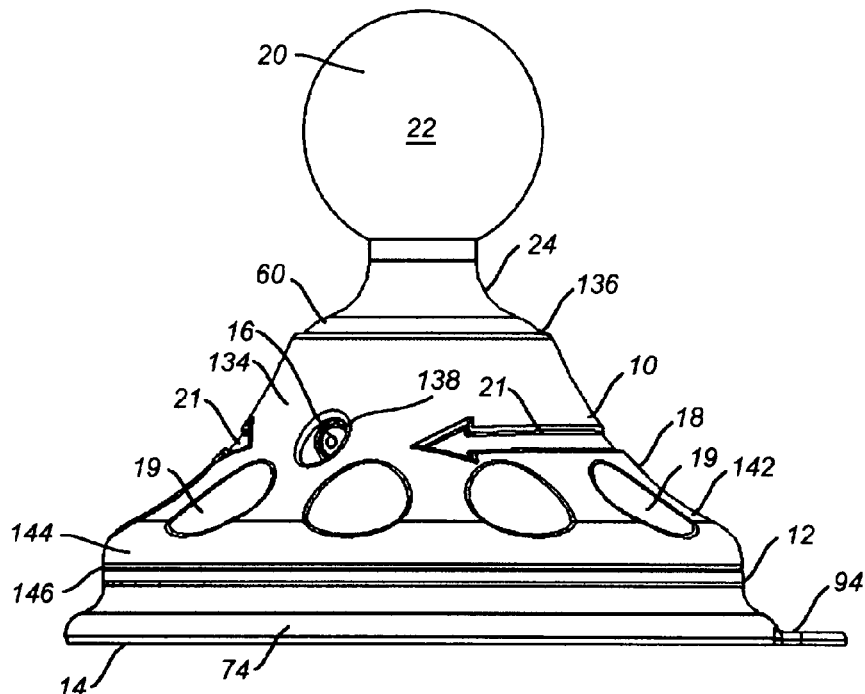
FIG. 10 is a side elevation view of the novel suction cup device.
Figure 11:
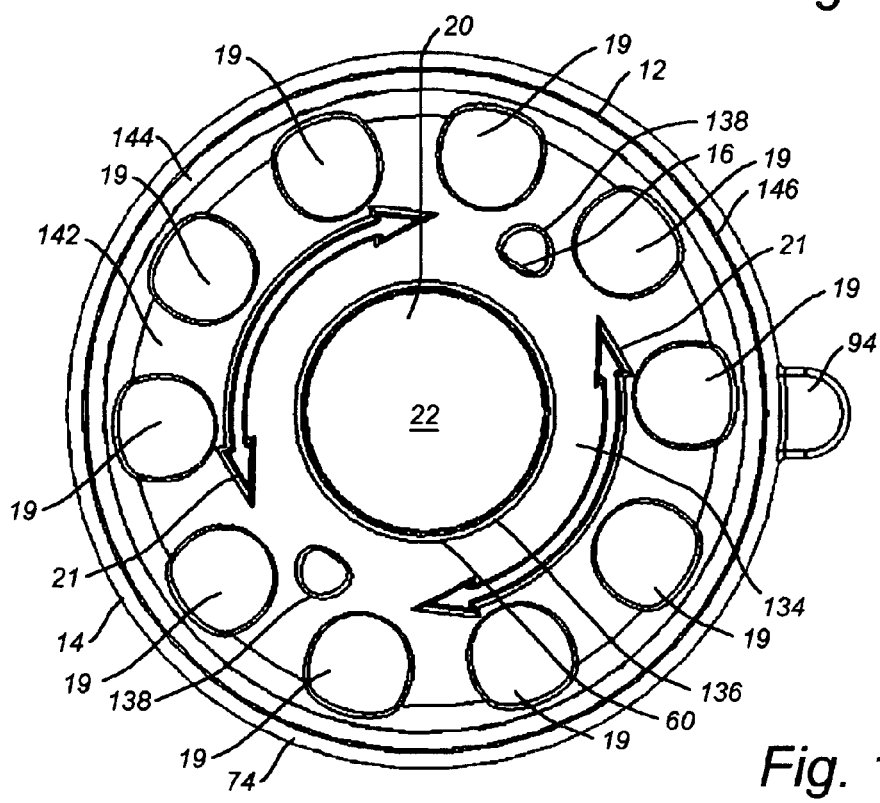
FIG. 11 is a top elevation view of the novel suction cup device.

FIG. 8 is another underneath exploded pictorial view that illustrates assembly of the novel suction cup device 10. Here, the outer wall portion 102 forming the tubular drive stack 60, and the cooperating wall portion 104 of the tubular drive shaft 72 are alternatively formed with optional mating nonround shapes. By example and without limitation substantially rectangular or square shapes are illustrated for the cooperating wall portions 102 and 104. Accordingly, the tubular drive shaft 72 and cooperating tubular drive stack 60 mate in a sliding fit only along the device operational drive axis 52, whereby mutual revolution about the device operational drive axis 52 is impossible. Furthermore, the guides 96 are provided as mating corners 168 and 170, and mating wall features 172 and 174 between the internal faces of the wall portion 102 forming the tubular drive stack 60 and the wall portion 104 forming the drive shaft 72. The aperture 128 in the drive stack floor portion 62 is a complementary nonround shape. The mating nonround corner features 168 and 170 and wall features 172 and 174 accordingly provide initial alignment between the tubular drive shaft 72 and the mating suction cup drive base 12, and subsequently maintain alignment therebetween.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A suction cup device having a compact axial installation and release mechanism, the suction cup device comprising:
    a) a drive base having a recess formed in a first surface and a drive stack aligned with the recess, and an aperture communicating between the recess and a chamber formed in the drive stack;
    b) a suction cup;
    c) a drive shaft coupled to a central portion of the suction cup and being sized to pass through the aperture in the drive base in substantially constant rotational orientation therewith; and
    d) an installation drive mechanism structured between the drive shaft and the drive stack, the installation drive mechanism further comprising:
        i) a pair of cooperating mutually inclined installation drive and reaction surfaces structured between the drive shaft and the drive stack, and
        ii) a drive pin rotatable relative to the installation drive and reaction surfaces.

2. The device of claim 1, further comprising a biasing mechanism positioned for urging the suction cup away from the recess formed in the first surface of the drive base.

3. The device of claim 1 wherein the drive stack portion of the drive base further comprises a utilization mounting surface formed distal of the first surface thereof.

4. The device of claim 3, further comprising a rotational drive member rotatable about the drive stack of the drive base external of the chamber formed therein and coupled to the drive pin.

5. The device of claim 1 wherein the drive stack portion of the drive base further comprises a tubular wall forming the chamber therein; and
    the drive shaft further comprises a tubular wall sized to be slidingly received into the chamber of the drive stack along an operational drive axis.

6. The device of claim 5 wherein one of the pair of cooperating mutually inclined installation drive and reaction surfaces further comprises a surface being inclined relative to the operational drive axis, and an other one of the installation drive and reaction surfaces further comprises a surface being substantially uninclined relative to the operational drive axis.

7. The device of claim 5, further comprising an anti-rotation mechanism formed between the drive shaft and the drive stack.

8. The device of claim 5 wherein pair of cooperating mutually inclined installation drive and reaction surfaces structured between the drive shaft and the drive stack further comprises a pair of the installation drive surfaces formed in opposing faces of the tubular wall forming the chamber therein, and a pair of the installation reaction surfaces formed in opposing faces of the tubular wall of the drive shaft.

9. The device of claim 8 wherein the drive stack further comprises a pair of slots formed in the opposing faces of the tubular wall thereof forming the chamber therein, each of the pair of slots forming one of the installation drive surfaces therein; and
    the drive shaft further comprises a pair of slots formed in the opposing faces of the tubular wall thereof, each of the pair of slots forming one of the installation reaction surfaces therein.

10. The device of claim 9 wherein the pair of slots formed in the opposing faces of the tubular wall of the drive stack further comprises a pair of release drive surfaces formed therein opposite from the installation drive surfaces; and
    the pair of slots formed in the opposing faces of the tubular wall of the drive shaft further comprises a pair of release reaction surfaces formed therein opposite from the installation reaction surfaces.

11. A suction cup device having a compact axial installation and release mechanism, the suction cup device comprising:
    a) a drive base comprising:
        i) a bell housing having a concave recess formed in a first surface thereof,
        ii) a drive stack coupled to the bell housing and having a chamber formed therein substantially aligned with the recess in the bell housing, and
        iii) an aperture communicating between the recess in the bell housing and the chamber formed in the drive stack;
    b) a plunger assembly comprising:
        i) a drive shaft sized to pass through the aperture in the drive base and at least partially into the chamber formed in the drive stack along an operational drive axis and in substantially constant rotational orientation therewith, and
        ii) a resiliently flexible suction cup coupled adjacent to an end of the drive shaft, the suction cup comprising a portion that is resiliently stretchable between the end of the drive shaft and a peripheral lip portion of the bell housing adjacent to the first surface thereof; and
    c) an installation drive mechanism structured between the drive shaft and the drive stack, the installation drive mechanism further comprising:
        i) a pair of cooperating mutually inclined installation drive and reaction surfaces structured between the drive shaft and the drive stack, and
        ii) a drive pin in substantial contact with both the installation drive and reaction surfaces and further rotatable about the operational drive axis relative to each of the installation drive and reaction surfaces.

12. The device of claim 11, further comprising a biasing mechanism positioned between the drive shaft and the drive stack for urging the drive shaft along the operational drive axis out of the chamber formed in the drive stack.

13. The device of claim 11 wherein the drive stack portion of the drive base further comprises a utilization mounting surface formed on the drive stack distal of the bell housing.

14. The device of claim 13, further comprising a rotational drive member rotatable about the drive stack of the drive base external of the chamber formed therein and coupled for rotating the drive pin about the operational drive axis.

15. The device of claim 11 wherein the chamber formed in the drive stack portion of the drive base further comprises a hollow cylinder formed by a cylindrical outer wall thereof;

the drive shaft further comprises a hollow cylinder formed by a cylindrical wall sized to be slidingly received into the hollow cylinder of the drive stack chamber along the operational drive axis; and further comprising an anti-rotation guide mechanism formed between the drive shaft and the drive stack.

16. The device of claim 15 wherein one of the pair of cooperating mutually inclined installation drive and reaction surfaces further comprises a surface being inclined relative to the operational drive axis, and a different one of the installation drive and reaction surfaces further comprises a surface oriented substantially normal to the operational drive axis.

17. The device of claim 16 wherein the installation drive surface further comprises the surface oriented substantially normal to the operational drive axis.

18. The device of claim 15 wherein pair of cooperating mutually inclined installation drive and reaction surfaces structured between the drive shaft and the drive stack further comprises a pair of the installation drive surfaces formed in substantially diametrically opposing faces of the cylindrical outer wall forming the chamber in the drive stack, and a pair of the installation reaction surfaces formed in substantially diametrically opposing faces of the cylindrical wall of the drive shaft.

19. The device of claim 18 wherein the drive stack further comprises a pair of slots formed in the opposing faces of the cylindrical outer wall thereof forming the chamber therein, each of the pair of slots forming one of the installation drive surfaces therein; and the drive shaft further comprises a pair of slots formed in the opposing faces of the cylindrical wall thereof, each of the pair of slots forming one of the installation reaction surfaces therein.

20. The device of claim 19 wherein the pair of slots formed in the opposing faces of the cylindrical outer wall of the drive stack further comprises a pair of release drive surfaces formed therein opposite from the installation drive surfaces and spaced relatively farther from the bell housing of the drive base; and the pair of slots formed in the opposing faces of the tubular wall of the drive shaft further comprises a pair of release reaction surfaces formed therein opposite from the installation reaction surfaces and spaced relatively closer to the end thereof having the suction cup coupled adjacent thereto.

21. A suction cup device having a compact axial installation and release mechanism, the suction cup device comprising:
 a) a substantially rigid drive base comprising:
  i) a bell housing having a substantially shallow concave recess formed in a first surface thereof,
  ii) a drive stack integral with the bell housing and projected substantially upright thereof adjacent to a central portion thereof external of the recess formed therein,
  iii) a substantially cylindrical chamber formed in the drive stack and substantially aligned with the recess in the bell housing and communicating therewith through an aperture formed therebetween, and
  iv) a utilization mounting surface formed on the drive stack distal of the bell housing;
 b) a plunger assembly comprising:
  i) a substantially cylindrical drive shaft sized to pass through the aperture in the drive base and at least partially into the chamber formed in the drive stack along an operational drive axis, and
  ii) a resiliently flexible suction cup coupled adjacent to an end of the drive shaft, the suction cup comprising a portion that is resiliently stretchable between the end of the drive shaft and a peripheral lip portion of the bell housing adjacent to the first surface thereof;
 c) an anti-rotation guide mechanism formed between the drive shaft and the drive stack; and
 d) a spiral installation drive mechanism structured between the drive shaft and the drive stack, the installation drive mechanism further comprising:
  i) pairs of cooperating mutually inclined drive and reaction slots structured between the drive shaft and the drive stack, wherein:
   1) each of the drive slots is further formed in the drive stack of the drive base with an installation drive surface adjacent to the bell housing and facing generally away therefrom, and
   2) each of the reaction slots is further formed in the drive shaft of the plunger assembly with an installation reaction surface spaced away from the suction cup and facing generally there toward, and
  ii) a substantially rigid drive pin inserted through the drive and reaction slots and further rotatable about the operational drive axis in substantially constant contact with both the installation drive and reaction surfaces.

22. The device of claim 21, further comprising a biasing mechanism positioned between the drive shaft and the drive stack for urging the drive shaft along the operational drive axis out of the chamber formed in the drive stack.

23. The device of claim 21, further comprising a rotational drive member rotatable about the operational drive axis relative to the drive stack of the drive base external of the chamber formed therein and coupled to the drive pin.

24. The device of claim 21 wherein one of the pairs of cooperating mutually inclined installation drive and reaction surfaces further comprises a pair of surfaces being inclined in a spiral about the operational drive axis, and a different one of the pairs of installation drive and reaction surfaces further comprises a pair of surfaces oriented substantially normal to the operational drive axis.

25. The device of claim 24 wherein the installation drive surfaces further comprise the surfaces oriented substantially normal to the operational drive axis.

26. The device of claim 21 wherein the pair of drive slots further comprises a pair of release drive surfaces formed therein opposite from the installation drive surfaces substantially parallel therewith and spaced relatively farther from the bell housing and facing generally there toward; and the pair of reaction slots further comprises a pair of release reaction surfaces formed therein opposite from the installation reaction surfaces substantially parallel therewith and spaced relatively closer to the suction cup and facing generally away therefrom.

27. A suction cup device having a compact axial installation and release mechanism, the suction cup device comprising:
 a) a drive base comprising a housing comprising a concavity formed in a first surface thereof, a substantially planar drive surface external of the concavity and substantially aligned therewith, and an aperture communicating through a floor of the concavity opposite from the first surface of the housing and substantially crosswise of the drive surface thereof;
 b) a suction cup plunger assembly comprising a suction cup of a resiliently deformable material that is coupled to a rigid and substantially tubular drive shaft sized to pass through the aperture communicating through the floor of the concavity of the housing of the drive base, the drive shaft further comprising a pair of substantially diametrically opposed installation reaction surfaces that are inclined relative to the drive shaft;

c) a drive pin that is movable relative to the drive shaft of the suction cup plunger assembly along the pair of inclined circumferential installation reaction surfaces; and d) a rotational drive member that is operable between the drive shaft of the suction cup plunger assembly and the housing of the drive base, the rotational drive member being coupled for rotating the drive pin relative to both the substantially planar drive surface of the of the housing and the drive shaft along the pair of inclined installation reaction surfaces thereof.

28. The device of claim 27, wherein the pair of substantially diametrically opposed installation reaction surfaces further comprises a pair of substantially symmetrical slots formed circumferentially through substantially opposite faces of a tubular wall portion of the drive shaft of the suction cup plunger assembly.

29. The device of claim 27, wherein the drive shaft of the suction cup plunger assembly and the housing of the drive base are further substantially aligned along a mutual operational drive axis, the substantially planar drive surface of the housing of drive base being oriented substantially crosswise of the operational drive axis, and the pair of installation reaction surfaces being inclined relative to the operational drive axis.

30. The device of claim 27, wherein the suction cup plunger assembly and the drive base are further assembled substantially along a mutual operational drive axis, the substantially planar drive surface external of the concavity of the housing of the drive base being oriented substantially crosswise of the operational drive axis, and the drive surface further comprising a peripheral lip portion of the housing around a mouth of the concavity adjacent to the first surface thereof; and the rotational drive member further comprises a lip oriented substantially crosswise of the operational drive axis and structured to substantially follow the drive surface of the housing.

31. The device of claim 30, wherein the drive pin is further extended between the pair of substantially diametrically opposed installation reaction surfaces of the drive shaft of the suction cup plunger assembly and an aperture of the rotational drive member oriented substantially crosswise of the operational drive axis and sized to receive the drive pin therethrough, whereby the drive pin is operationally coupled between the pair of installation reaction surfaces of the drive shaft of the suction cup plunger assembly and the drive surface of the housing of the drive base through the rotational drive member.

32. The device of claim 27, further comprising an anti-rotation guide mechanism for maintaining substantially constant relative rotational orientation between the drive shaft of the suction cup plunger assembly and the housing of the drive base.

\* \* \* \* \*